US012727025B2

(12) United States Patent
Lin et al.

(10) Patent No.: US 12,727,025 B2
(45) Date of Patent: Sep. 1, 2026

(54) SECOND MESSAGE DIFFERENTIATION IN RANDOM ACCESS PROCEDURE

(71) Applicant: Telefonaktiebolaget LM Ericsson (publ), Stockholm (SE)

(72) Inventors: Zhipeng Lin, Nanjing (CN); Jingya Li, Gothenburg (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 370 days.

(21) Appl. No.: 18/031,483

(22) PCT Filed: Oct. 12, 2021

(86) PCT No.: PCT/EP2021/078155
§ 371 (c)(1),
(2) Date: Apr. 12, 2023

(87) PCT Pub. No.: WO2022/079014
PCT Pub. Date: Apr. 21, 2022

(65) Prior Publication Data

US 2023/0379963 A1 Nov. 23, 2023

(30) Foreign Application Priority Data

Oct. 16, 2020 (WO) ................ PCT/CN2020/121478

(51) Int. Cl.
*H04W 74/00* (2009.01)
*H04L 5/00* (2006.01)
(Continued)

(52) U.S. Cl.
CPC ......... *H04W 74/006* (2013.01); *H04L 5/0053* (2013.01); *H04W 74/0833* (2013.01); *H04W 74/0836* (2024.01)

(58) Field of Classification Search
None
See application file for complete search history.

(56) References Cited

U.S. PATENT DOCUMENTS

2019/0313437 A1* 10/2019 Jung ..................... H04L 5/0042
2019/0327767 A1 10/2019 Islam et al.
(Continued)

OTHER PUBLICATIONS

International Search Report and Written Opinion issued in International Application No. PCT/EP2021/078155 dated Feb. 1, 2022 (17 pages).
(Continued)

*Primary Examiner* — Saad Khawar
(74) *Attorney, Agent, or Firm* — Rothwell, Figg, Ernst & Manbeck, P.C.

(57) ABSTRACT

A method (2000) performed by a communication device (102, 104). The method includes selecting (s2002) a random access (RA) configuration from a set of two more RA configurations. The set of RA configurations includes at least one of: i) common search space, CSS, information identifying a set of two or more CSSs, or ii) a set of two or more control resource set, CORESET, configurations, and selecting the RA configuration comprises selecting a CSS from the set of two or more CSS or selecting a CORESET configuration from the set of two or more CORESET configurations. The method also includes using (s2004) the selected RA configuration to perform a second step of a random access procedure.

11 Claims, 20 Drawing Sheets

(51) Int. Cl.
*H04W 74/0833* (2024.01)
*H04W 74/0836* (2024.01)

(56) References Cited

U.S. PATENT DOCUMENTS

2020/0314917 A1 10/2020 Jeon et al.
2021/0337602 A1 * 10/2021 Liu .................... H04W 74/002

OTHER PUBLICATIONS

3GPP TS 38.213 V16.7.0 (Sep. 2021), 3rd Generation Partnership Project; Technical Specification Group Radio Access Network; NR; Physical layer procedures for control (Release 16), Sep. 2021 (188 pages).

3GPP TS 38.211 V16.3.0 (Sep. 2020), 3rd Generation Partnership Project; Technical Specification Group Radio Access Network; NR; Physical channels and modulation (Release 16), Sep. 2020 (133 pages).

3GPP TS 38.213 V16.3.0 (Sep. 2020), 3rd Generation Partnership Project; Technical Specification Group Radio Access Network; NR; Physical layer procedures for control (Release 16), Sep. 2020 (179 pages).

3GPP TS 38.331 V16.2.0 (Sep. 2020), 3rd Generation Partnership Project; Technical Specification Group Radio Access Network; NR; Radio Resource Control (RRC) protocol specification (Release 16), Sep. 2020 (921 pages).

* cited by examiner

| | | |
|---|---|---|
| R | Timing Advance Command | Oct 1 |
| Timing Advance Command | UL Grant | Oct 2 |
| UL Grant | | Oct 3 |
| UL Grant | | Oct 4 |
| UL Grant | | Oct 5 |
| Temporary C-RNTI | | Oct 6 |
| Temporary C-RNTI | | Oct 7 |

s1402 detecting a need to establish a connection with an access point s1404 transmitting a random access, RA, preamble to the access point s1406 receiving a first RA response transmitted by the access point s1408 determining a priority value associate with the received first RA response s1410 determining, based on the priority value, whether or not the first RA response is intended for a UE other than the first UE

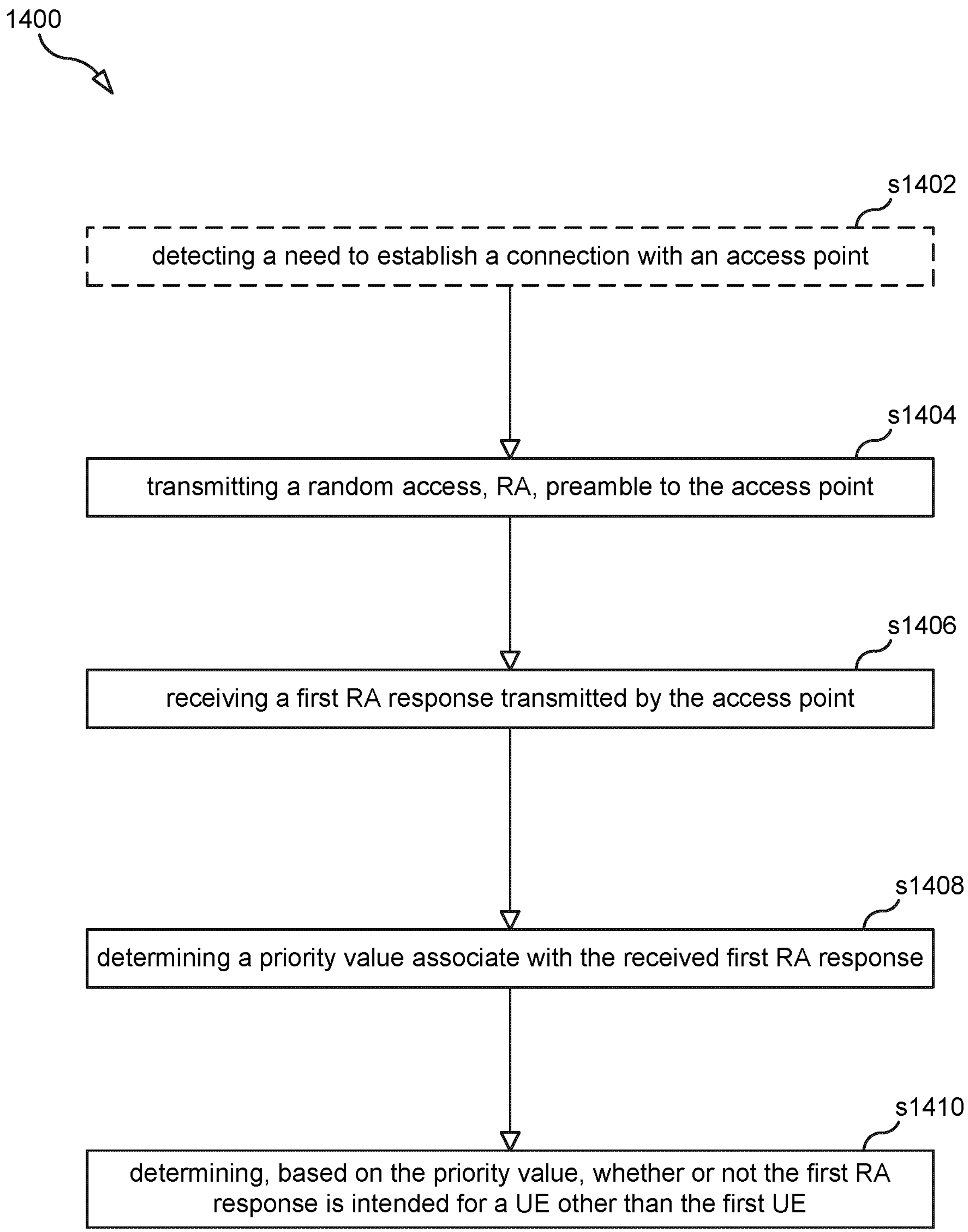

FIG. 14

1900
s1902
selecting a particular control resource set (CORSET) configuration from a set of two or more default CORSET configurations
s1904
using the selected CORSET configuration to perform a RACH procedure

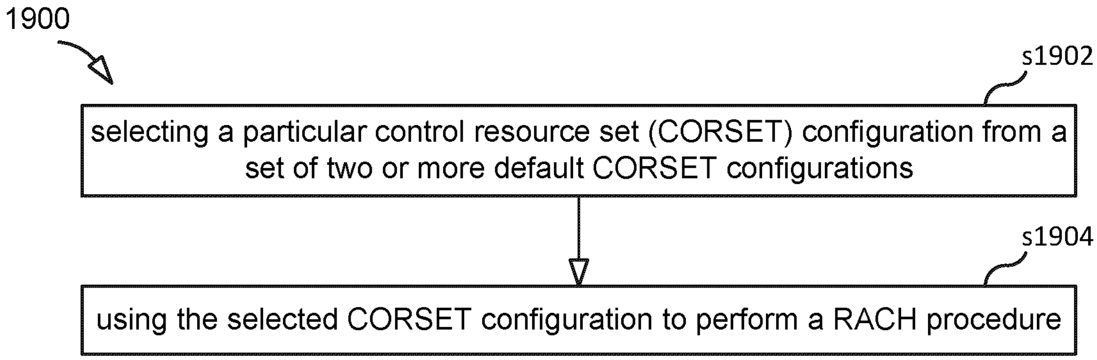

FIG. 19A
1910
s1912
selecting a particular common search space (CSS) from a set of two or more default CSSs
s1914
using the selected CSS to perform a RACH procedure

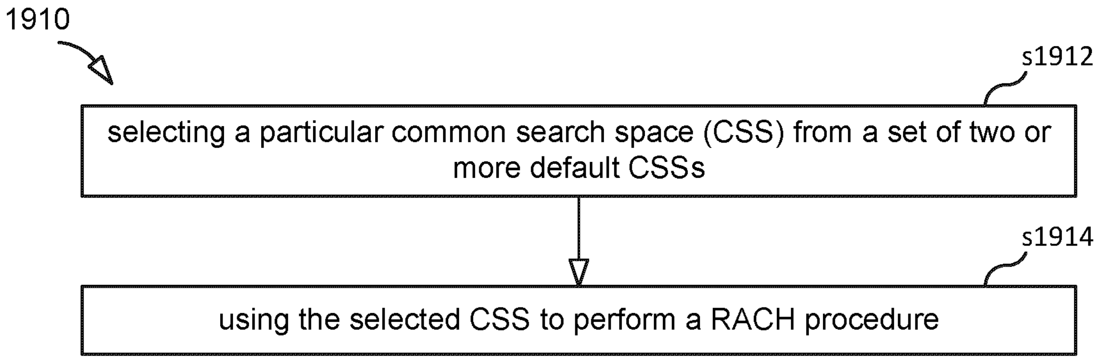

FIG. 19B
1920
s1922
broadcasting a SIB comprising: i) a first CORSET configuration for use by UEs belonging to a first group of UEs when performing a RACH procedure and ii) a second CORESET configuration for use by a UEs belonging to a second group of UEs when performing the RACH procedure

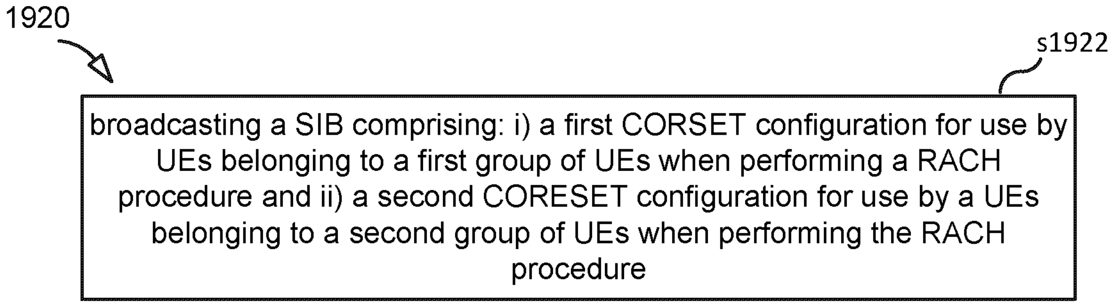

FIG. 19C
1930
s1932
broadcasting a SIB comprising: i) first CSS information identifying a first CSS for use by UEs belonging to a first group of UEs when performing a RACH procedure and ii) a second CSS information identifying a second CSS for use by a UEs belonging to a second group of UEs when performing the RACH procedure

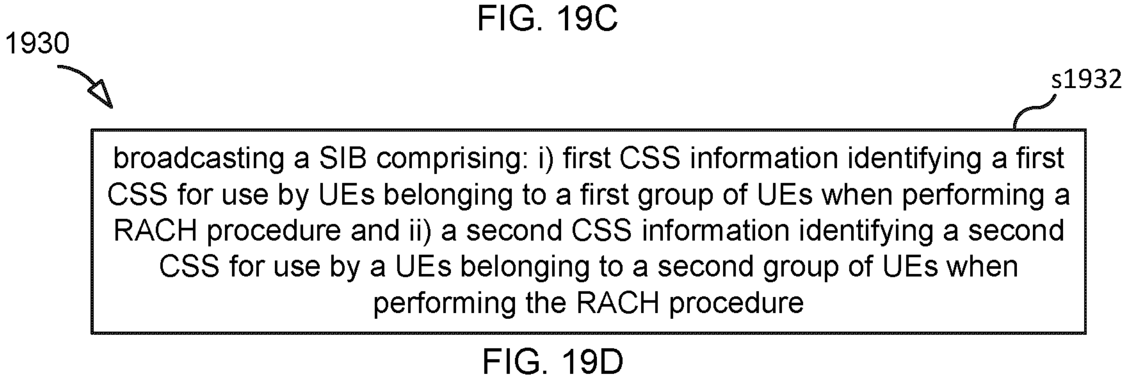

FIG. 19D

SECOND MESSAGE DIFFERENTIATION IN RANDOM ACCESS PROCEDURE

CROSS REFERENCE TO RELATED APPLICATIONS

This application is a 35 U.S.C. § 371 National Stage of International Patent Application No. PCT/EP2021/078155, filed 2021 Oct. 12, which claims priority to International Patent Application No. PCT/CN2020/121478, filed on 2020 Oct. 16, which is incorporated by this reference.

TECHNICAL FIELD

Disclosed are embodiments related to the random access (RA) procedure for establishing a connection with an access point (e.g., 5G base station (gNB)).

BACKGROUND

1. NR Initial Access

Before a user equipment (UE) (i.e., a communication device capable of communicating wirelessly with an access point (e.g., a base station)) can properly communicate within another communication device (e.g., a server), the UE must perform what is known as "cell search" to find, identify, and synchronize with a cell served by an access point. Then, the UE must acquire basic system information, and perform an access barring check to determine whether or not the UE is allowed to use the cell for network connectivity. If the access is allowed, the UE will then perform what is known as a random access procedure to establish a connection (e.g., a Radio Resource Control (RRC) connection) with the access point. Examples of UEs include: smartphones, sensors, appliances, meters, computers, servers, etc.

1.1. New Radio (NR) cell search and System Information Acquisition

In NR, the combination of synchronization signals (SSs) and a physical broadcast channel (PBCH) is referred to as a SS/PBCH block (SSB). Similar to LTE, a pair of synchronization signals (i.e., a primary synchronization signal (PSS) and secondary synchronization signal (SSS)) is periodically transmitted on downlink from each cell to allow a UE to initially access to the network. By detecting SS, a UE can obtain the physical cell identity, achieve downlink synchronization in both time and frequency, and acquire the timing for PBCH.

The PBCH carries the master information block (MIB), which contains system information that enables a UE to acquire System Information Block 1 (SIB 1). SIB1 carries system information that enables the UE to perform the random-access procedure.

1.2. NR 4-Step Random Access Procedure

The 4-step random access procedure, also referred to as the Type-1 random access procedure in 3GPP TS 38.213. In a first step, a UE initiates the random-access procedure by transmitting a random-access preamble (RAP) (a.k.a., "Message 1" or "Msg 1") on the Physical Random Access Channel (PRACH). In a second step, which occurs after detecting the Msg1, the gNB responds by transmitting to the UE on the Physical Downlink Control Channel (PDCCH) Downlink Control Information (DCI) (e.g., DCI format 1_0) to prepare the UE to receive a random-access response (RAR) (a.k.a., "Message 2" or "Msg2") and then sends the RAR on the Physical Downlink Shared Channel (PDSCH) (step 2). In a third step, after successfully decoding Msg2, the UE continues the procedure by transmitting a message (a.k.a., "Message 3" or "Msg3") on the Physical Uplink Shared Channel (PUSCH). Msg3 is or contains an RRC connection establishment request. In the last step of the procedure, the gNB transmits a message (a.k.a., "Message 4" or "Msg4") on the Physical Downlink Shared Channel (PDSCH) for contention resolution.

It may be the case that more than one UE transmits the same random-access preamble using the same PRACH time/frequency resource. This creates a preamble "collision," which is also called contention. One of the main purposes of applying Step 3 and Step 4 is to resolve such potential contention.

1.3. NR 2-Step Random Access Procedure

The 2-step random access produce is also referred to as Type-2 random access procedure in TS 38.213. In the first step, a UE sends on the PUSCH a first message (MsgA) that includes a random access preamble together with higher layer data such as an RRC connection request possibly with some small payload. In the second step, after detecting the MsgA, the access point sends to the UE DCI (e.g., DCI format 1_0) on the PDCCH and then sends an RAR (a.k.a., "MsgB") which includes a UE identifier assignment, timing advance information, contention resolution message, etc.

2. Msg1 Configuration in 4-Step Random Access Procedure

In NR, the time and frequency resource on which a random-access preamble (Msg 1) is transmitted is defined as a PRACH occasion.

The time resources and preamble format for the Msg1 transmission is configured by a PRACH configuration index, which indicates a row in a PRACH configuration table specified in 3GPP TS 38.211 tables 6.3.3.2-2, 6.3.3.2-3, 6.3.3.2-4 for FR1 paired spectrum, FR1 unpaired spectrum, and FR2 with unpaired spectrum, respectively.

Part of Table 6.3.3.2-3 for FR1 unpaired spectrum for preamble format 0 is reproduced below in Table 1, where the value of x indicates the PRACH configuration period in number of system frames, and the value of y indicates the system frame within each PRACH configuration period on which the PRACH occasions are configured. For instance, if y is set to 0, then it means PRACH occasions only configured in the first frame of each PRACH configuration period. The values in the column "subframe number" indicates the subframes that are configured with PRACH occasion. The values in the column "starting symbol" is the symbol index.

In case of Time Division Duplexing (TDD), semi-statically configured downlink (DL) parts and/or actually transmitted SSBs can override and invalidate some time-domain PRACH occasions defined in the PRACH configuration table. More specifically, PRACH occasions in the uplink (UL) part are always valid, and a PRACH occasion within the X part is valid as long as it does not precede or collide with an SSB in the RACH slot and it is at least N symbols after the DL part and the last symbol of an SSB. N is 0 or 2 depending on PRACH format and subcarrier spacing.

TABLE 1

PRACH configuration for preamble format 0 for FRI unpaired spectrum

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | | | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In the frequency domain, NR supports multiple frequency-multiplexed PRACH occasions on the same time-domain PRACH occasion. This is mainly motivated by the support of analog beam sweeping in NR such that the PRACH occasions associated to one SSB are configured at the same time instance but at different frequency locations. The starting position in the frequency is indicated by the higher-layer parameter msg1-FrequencyStart in SIB1, and the number of consecutive PRACH occasions frequency division multiplexed (FDMed) in one time instance is configured by the higher-layer parameter msg1-FDM in SIB 1. The number of PRACH occasions FDMed in one time domain PRACH occasion can be 1, 2, 4, or 8.

Here the msg1-FDM and msg1-Frequency Start are defined in 3GPP TS 38.331 as follows: 1) "msg1-FDM: The number of PRACH transmission occasions FDMed in one time instance"; 2) "msg1-Frequency Start: Offset of lowest PRACH transmission occasion in frequency domain with respective to PRB 0. The value is configured so that the corresponding Random Access Channel (RACH) resource is entirely within the bandwidth of the UL BWP." The msg1-FDM information element (IE) and msg1-FrequencyStart IE are part of the RACH-ConfigGeneric IE, which is shown in Table 2 below.

TABLE 2

RACH-ConfigGeneric information element

```
-- ASN1START
-- TAG-RACH-CONFIG-GENERIC-START
RACH-ConfigGeneric ::=            SEQUENCE {
  prach-ConfigurationIndex          INTEGER (0..255),
  msg1-FDM                          ENUMERATED {one, two, four, eight},
  msg1-FrequencyStart               INTEGER (0..maxNrofPhysicalResourceBlocks-1),
  zeroCorrelationZoneConfig         INTEGER(0..15),
  preambleReceivedTargetPower       INTEGER (−202..−60),
  preambleTransMax                  ENUMERATED {n3, n4, n5, n6, n7, n8, n10, n20,
                                      n50, n100, n200},
```

TABLE 2-continued

| RACH-ConfigGeneric information element | |
|---|---|
| powerRampingStep | ENUMERATED {dB0, dB2, dB4, dB6}, |
| ra-ResponseWindow | ENUMERATED {sl1, sl2, sl4, sl8, sl10, sl20, sl40, sl80}, |
| ... | |
| } | |
| -- TAG-RACH-CONFIG-GENERIC-STOP | |
| -- ASN1STOP | |

FIG. 3 gives an example of the PRACH occasion configuration in NR.

In NR release fifteen (Rel-15), there are up to 64 sequences that can be used as random-access preambles per PRACH occasion in each cell. The RRC parameter totalNumberOfRA-Preambles determines how many of these 64 sequences are used as random-access preambles per PRACH occasion in each cell. The 64 sequences are configured by including firstly all the available cyclic shifts of a root Zadoff-Chu sequence, and secondly in the order of increasing root index, until 64 preambles have been generated for the PRACH occasion.

3. MsgA Configuration in 2-Step Random Access Procedure

3.1 MsgA Preamble Configuration

The RACH occasions for 2-step RACH can be separately configured (also known as Type-2 random access procedure with separate configuration of PRACH occasions with Type-1 random access procedure) or are shared with 4-step RACH (also known as Type-2 random access procedure with common configuration of PRACH occasions with Type-1 random access procedure) in which case different set of preamble IDs will be used.

For Type-2 random access procedure with common configuration of PRACH occasions with Type-1 random access procedure, a UE is provided a number of SS/PBCH blocks associated with one PRACH occasion by ssb-perRACH-OccasionAndCB-PreamblesPerSSB and a number of contention based preambles per SS/PBCH block per valid PRACH occasion by msgA-CB-PreamblesPerSSB. The PRACH transmission can be on a subset of PRACH occasions associated with a same SS/PBCH block index for a UE provided with a PRACH mask index by msgA-ssb-sharedRO-MaskIndex. An example of the SSB to PRACH occasion mapping and the preamble allocation is provided in FIG. 4 Note that only one preamble group is assumed in this example.

For Type-2 random access procedure with separate configuration of PRACH occasions with Type-1 random access procedure, a UE is provided a number of SS/PBCH blocks associated with one PRACH occasion and a number of contention based preambles per SS/PBCH block per valid PRACH occasion by ssb-perRACH-OccasionAndCB-PreamblesPerSSB-msgA when provided; otherwise, by ssb-perRACH-OccasionAndCB-PreamblesPerSSB. Since the SSB to PRACH occasion mapping and the preamble allocation are independently configured, the example provided for 4-step RACH is also valid for this case of 2-step RACH except that the parameters are separately configured for 2-step RACH.

3.2 MsgA PUSCH Configuration

A PUSCH occasion is defined as the time frequency resource used for one PUSCH transmission. For one msgA PUSCH occasion, one or more Downlink Modulation Reference Signals (DMRS) resources can be configured, one of which will be selected for each PUSCH transmission within the PUSCH occasion.

A set of PUSCH occasions are configured per MsgA PUSCH configuration which are relative to and mapped by a group of preambles in a set of PRACH occasions in one PRACH slot. A mapping between one or multiple PRACH preambles and a PUSCH occasion associated with a DMRS resource is according to the mapping order as described below.

Each consecutive number of $N_{preamble}$ preamble indexes from valid PRACH occasions in a PRACH slot, first, in increasing order of preamble indexes within a single PRACH occasion, second, in increasing order of frequency resource indexes for frequency multiplexed PRACH occasions, third, in increasing order of time resource indexes for time multiplexed PRACH occasions within a PRACH slot, are mapped to a valid PUSCH occasion and the associated DMRS resource, first, in increasing order of frequency resource indexes $f_{id}$ for frequency multiplexed PUSCH occasions, second, in increasing order of DMRS resource indexes within a PUSCH occasion, where a DMRS resource index $DMRS_{id}$ is determined first in an ascending order of a DMRS port index and second in an ascending order of a DMRS sequence index, third, in increasing order of time resource indexes $t_{id}$ for time multiplexed PUSCH occasions within a PUSCH slot, fourth, in increasing order of indexes for $N_S$ PUSCH slots, where $N_{preamble}$=ceil($T_{preamble}/T_{PUSCH}$), $T_{preamble}$ is a total number of valid PRACH occasions per association pattern period multiplied by the number of preambles per valid PRACH occasion provided by msgA-PUSCH-PreambleGroup, and $T_{PUSCH}$ is a total number of valid PUSCH occasions per PUSCH configuration per association pattern period multiplied by the number of DMRS resource indexes per valid PUSCH occasion provided by msgA-DMRS-Config.

4. RNTI for the 2nd Message in the Random Access Procedure

Table 3 provides the range of RNTI values, where RA-RNTI and MSGB-RNTI are defined for msg2 and MsgB in 4-step random access procedure and 2-step random access procedure, respectively.

TABLE 3

| RNTI values | |
|---|---|
| Value (hexa-decimal) | RNTI |
| 0000 | N/A |
| 0001-FFEF | RA-RNTI, MSGB-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFFD | Reserved |
| FFFE | P-RNTI |
| FFFF | SI-RNTI |

RA-RNTI or MSGB-RNTI are used for the CRC scrambling for DCI format 1_0 which is used for scheduling of Msg2 or MsgB PDSCH transmission. The following information is transmitted by means of the DCI format 1_0 with CRC scrambled by RA-RNTI or msgB-RNTI:

Frequency domain resource assignment - $\lceil \log_2(N_{RB}^{DL,BWP}(N_{RB}^{DL,BWP}+1)/2) \rceil$ bits;

$N_{RB}^{DL,BWP}$ is the size of CORESET 0 if CORESET 0 is configured for the cell and $N_{RB}^{DL,BWP}$ is the size of initial DL bandwidth part if CORSET 0 is not configured for the cell Time domain resource assignment - 4 bits as defined in Clause 5.1.2.1 of [6, TS38.214]

VRB-to-PRB mapping - 1 bit according to Table 7.3.1.2.2-5

Modulation and coding scheme - 5 bits as defined in Clause 5.1.3 of [6, TS38.214], using Table 5.1.3.1-1

TB scaling - 2 bits as defined in Clause 5.1.3.2 of [6, TS38.214]

LSBs of SFN - 2 bits for the DCI format 1_0 with CRC scrambled by msgB-RNTI or 2 bits as defined in Clause 8 of [5, TS 38.213] for operation in a cell with shared spectrum channel access; 0 bit otherwise Reserved bits - 14 bits for the DCI format 1_0 with CRC scrambled by msgB-RNTI or for operation in a cell with shared spectrum channel access; otherwise 16 bits

4.1 RA-RNTI for Message 2 in 4-Step Random Access Procedure

After transmission of msg1, UE will monitor the PDCCH for DCI with its CRC scrambled by RA-RNTI within a RAR window for receiving msg2.

The RA-RNTI is used for UEs for msg2 reception except for contention-free Random Access Preamble for beam failure recovery request where a C-RNTI is used.

The RA-RNTI associated with the PRACH occasion in which the Random Access Preamble is transmitted, is computed as:

$$RA\text{-}RNTI = 1 + s\_id + 14 \times t\_id + 14 \times 80 \times f\_id + 14 \times 80 \times 8 \times ul\_carrier\_id$$

where:

s_id is the index of the first Orthogonal Frequency Demultiplexing (OFDM) symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id (a.k.a., ul_c_id) is the UL carrier used for Random Access Preamble transmission (0 for NUL carrier, and 1 for SUL carrier).

The MAC RAR is octet aligned, and it provides the temporary C-RNTI for the message 3 and message 4, as shown in FIG. 5.

4.2 MSGB-RNTI for MsgB in 2-Step Random Access Procedure

After transmission of MsgA, UE will monitor the PDCCH for a DCI with its CRC scrambled by MSGB-RNTI with in a RAR window for receiving MsgB.

The MSGB-RNTI associated with the PRACH occasion in which the Random Access Preamble is transmitted, is computed as:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2,$$

where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of p specified in clause 5.3.2 in TS 38.211, f_id is the index of the PRACH occasion in the frequency domain (0≤f_id<8), and ul_carrier_id is the UL carrier used for Random Access Preamble transmission (0 for NUL carrier, and 1 for SUL carrier).

As can be seen, a fixed offset of 14×80×8×2 is added to RA-RNTI to form MSGB-RNTI so that the RA-RNTI and MSGB-RNTI calculated based on same RACH occasion will have different values.

The RAR for MsgB can be successRAR when both MsgA preamble and MsgA PUSCH are decoded or fallbackRAR when only preamble part is detected while MsgA PUSCH failed to be decoded.

The fallbackRAR is octet aligned and has a structure shown in FIG. 6. The successRAR is octet aligned and has the structure illustrated in FIG. 7.

5. RRC Establishment Cause for UE Differentiation

In step 3 of the 4-step random access procedure, a UE includes the rrcSetupRequest message in Msg3. The rrcSetupRequest message contains the IE establishmentCause, which indicates the reason that caused the UE to initiate the connection establishment, e.g., emergency call, mission critical services, multimedia priority services, etc.

A gNB identifies the type of connection request from the UE by decoding the establishmentCause IE received in msg3, based on which, the gNB decides whether this request shall be admitted or rejected, based on the network traffic load situation and available resource in the network.

6. 5G Use Cases and Services

6.1 Mission Critical Communications

First responders, such as fire-fighters, policemen and emergency medical service personnel, require fast, reliable, and secure communications in various mission critical (MC)

situations. During major emergency incidents, such as nature disasters, there can be a high demand of MC traffic for supporting first responders' rescue operation on site. At the same time, mobile data traffic generated by public users can increase significantly, e.g., for making emergency calls, sharing information to friends or relatives. If first responders and general public users share the same network, it is crucial to ensure the flow of critical information (e.g., MC services and emergency calls) no matter how busy the network is. This brings stringent requirements for 5G access control mechanisms to be able to early identify and prioritize access requests from mission critical users, to guarantee that they are accepted and properly served even when the network experiences congestion.

6.2 Small Data Transmission (SDT)

NR supports the RRC_INACTIVE state and UEs with infrequent (periodic and/or non-periodic) data transmission are generally maintained by the network in the RRC_INACTIVE state. Until NR Rel-16, the RRC_INACTIVE state doesn't support data transmission. Hence, the UE has to resume the connection (i.e. move to RRC_CONNECTED state) for any downlink (DL) (mobile terminated (MT)) and uplink (UL) (mobile originated (MO)) data. Connection setup and subsequently release to INACTIVE state happens for each data transmission however small and infrequent the data packets are. This results in unnecessary power consumption and signaling overhead. A work item for support of SDT (Small data transmission) in NR release 17 is approved in RAN #86.

In RAN2 #111-e meeting it has been agreed that both 2-step RACH and 4-step RACH will be applied to RACH based uplink small data transmission via Msg3 PUSCH or MsgA PUSCH. To support SDT on Msg3 PUSCH or MsgA PUSCH, the network node needs to be able to identify/differentiate an access request related to SDT from other access requests.

6.3 Satellite Communications

Satellite access networks have been playing a complementary role in the communications ecosystem. Despite the wide deployment of terrestrial mobile networks, there are unserved or underserved areas around the globe. For example, providing coverage in rural or remote areas has been challenging in many countries because the investment cost may not justify the expected revenue. In contrast, a single communication satellite can cover a large geographic area, and thus it might be economically appealing to use satellite communications to augment terrestrial networks to provide connectivity in rural and remote areas. In urban areas, high-throughput satellites communications systems may help offload traffic in terrestrial networks. Another potential alternative is to use satellites for backhauling, fostering the rollout of 5G services with potentially reduced costs in rural and remote areas.

The large satellite coverage can also benefit communication scenarios with airborne and maritime platforms (onboard aircrafts or vessels), while being attractive in certain machine-to-machine and telemetry applications. Additionally, satellites are resilient to natural disasters on earth, making satellite communications key for emergency services in case that the terrestrial network infrastructures are degraded. Therefore, if multiple services (MBB, MC Services, TV broadcast, SDT services) are supported by satellite communications, it is beneficial for a satellite base station to be able to differentiate different services or UE types at an early stage so that it can optimize its own the admission control and scheduling decisions, or/and better coordinate with the terrestrial network nodes to secure the flow of critical information.

6.4 5G Network Slicing

Network slicing is a concept introduced in 5G to enable service differentiation on a common network infrastructure. Each slice can be a collection of network functionalities or/and resources that are optimized to meet the specific requirement for a service type. For instance, a network can configure different slices for eMBB service, V2X service, MC service, etc. The current NR standard support only resource separation of user plane data, not the full separation of control plane resources, meaning that all network slices share the same RACH configuration for UEs in the RRC Idle/Inactive states.

SUMMARY

Certain challenges presently exist. For instance, based on the NR Rel-15 and Rel-16 4-step random access (RA) procedure (a.k.a., "RACH procedure"), during an initial access phase, the earliest time for a network node to identify a UE or service type (e.g., a mission critical (MC) UE that is configured with MC services) is in step 3 of the RA procedure, i.e., after a successful reception of the RRC establishment cause in msg3 transmitted by the UE. Regardless of the UE's subscription type or their service type or their configured network slice, for all UEs in RRC Idle or Inactive states, they are configured with the same 4-step RACH configuration, e.g., the same PRACH occasions and the same PRACH configuration index, etc., for transmitting msg1 when performing random access. Therefore, it is not possible for a network node to differentiate or identify the UE type, the service type nor the slice ID, by detecting msg1. And therefore the network cannot prioritize or optimize Msg1/Msg2/Msg3 transmissions for certain high priority services or some slices in random access.

In addition, according current NR standard (NR Rel-15 and Rel-16), the establishmentCause for all MC UEs will be set to mcs-PriorityAccess. This implies that a network node can't further differentiate between different MC UEs/Services in an initial access procedure.

For a 2-step RA procedure, on whether msgA PUSCH or msgA preamble part are used to identify a mission critical UE, it should take into account that the reliability of msgA preamble part and PUSCH part might be quite different due to the PUSCH is colliding in 2-step RACH. In another aspect, the msgA PUSCH resource used for higher priority may need to be prioritized so that the msgA PUSCH performance can be assured especially if msgA preamble part cannot be used for UE priority identification.

Hence, early UE differentiation (e.g., early service differentiations) via msg1 PRACH configuration in 4-step RA or msgA PRACH configuration in 2-step RA is needed. It has been proposed to use different first message configuration methods to support early differentiation between UEs associated with different service classes (e.g., a UE requiring one type of service vs a UE requiring a different type of service) during random access procedure.

When different PRACH configurations are configured for different UEs with, for example, different priorities or different services or different network slices, there can be cases that the preambles transmitted from different UEs with different priority levels/services are mapped to the same RA-RNTI or MsgB-RNTI value. This makes it difficult for the network to prioritize or optimize the RAR transmissions for, for example, high priority UEs in the second step of a random access procedure. What is, therefore, needed is a way to differentiate the 2nd message for UEs with, for example, different priorities or service types.

Accordingly, in one aspect there is provided a method performed by a communication device (e.g., a UE or an access point). The method includes the communication device selecting a random access (RA) configuration from a set of two more RA configurations. The set of RA configurations includes at least one of i) common search space (CSS) information identifying a set of two or more CSSs or ii) a set of two or more control resource set (CORESET) configurations, and selecting the RA configuration comprises selecting a CSS from the set of two or more CSS or selecting a CORESET configuration from the set of two or more CORESET configurations. The method also includes using the selected RA configuration to perform a second step of an RA procedure.

In another aspect there is provided a computer program comprising instructions which when executed by processing circuitry of a communication device, causes the communication device to perform the above described method. In another aspect there is provided a carrier containing the computer program, wherein the carrier is one of an electronic signal, an optical signal, a radio signal, and a computer readable storage medium.

In another aspect there is provided a communication device where the communication device is configured to perform the communication device methods disclosed herein. In some embodiments, the communication device includes processing circuitry and a memory containing instructions executable by the processing circuitry, whereby the communication device is configured to perform the communication device methods disclosed herein.

In another aspect there is provided a method performed by a network node. The method includes the network node broadcasting a system information block (SIB) comprising: i) first common search space, CSS, information identifying a first CSS for use by UEs belonging to a first group of UEs when performing an RA procedure and ii) second CSS information identifying a second CSS for use by UEs belonging to a second group of UEs when performing the RA procedure.

In another aspect there is provided a computer program comprising instructions which when executed by processing circuitry of a network node, causes the network node to perform the above described network node method. In another aspect there is provided a carrier containing the computer program, wherein the carrier is one of an electronic signal, an optical signal, a radio signal, and a computer readable storage medium.

In another aspect there is provided a network node where the network node is configured to perform the network node methods disclosed herein. In some embodiments, the network node includes processing circuitry and a memory containing instructions executable by the processing circuitry, whereby the network node is configured to perform the network node methods disclosed herein.

The embodiments are advantageous in that they each provide a way for differentiating the 2nd message transmissions for UEs with different service classes (e.g., UEs using different network slices or UEs using different services or UEs having different priority levels). For example, when the access point receives an RA preamble from a first UE seeking to obtain, for example, an SDT service, the access point can transmit DCI using a first CSS, and when the access point receives a RA preamble from a second UE seeking to obtain, for example, a non-SDT service, the access point can transmit DCI using a second CSS that does not overlap with the first CSS; the first UE will monitor the first CSS, while the second UE will monitor the second CSS. The embodiments, therefore, solve the potential ambiguity issue when the preambles transmitted from UEs with different priority levels would otherwise be mapped to the same RA-RNTI or MsgB-RNTI value. The proposed embodiments also enable more flexible prioritization and/or optimization of RAR transmissions for UEs that should be treated differently than other UEs.

BRIEF DESCRIPTION OF THE DRAWINGS

The accompanying drawings, which are incorporated herein and form part of the specification, illustrate various embodiments.

FIG. 14 is a flowchart illustrating a process according to some embodiments.

FIG. 19 is a flowchart illustrating a process according to some embodiments.

DETAILED DESCRIPTION

Figure 1:
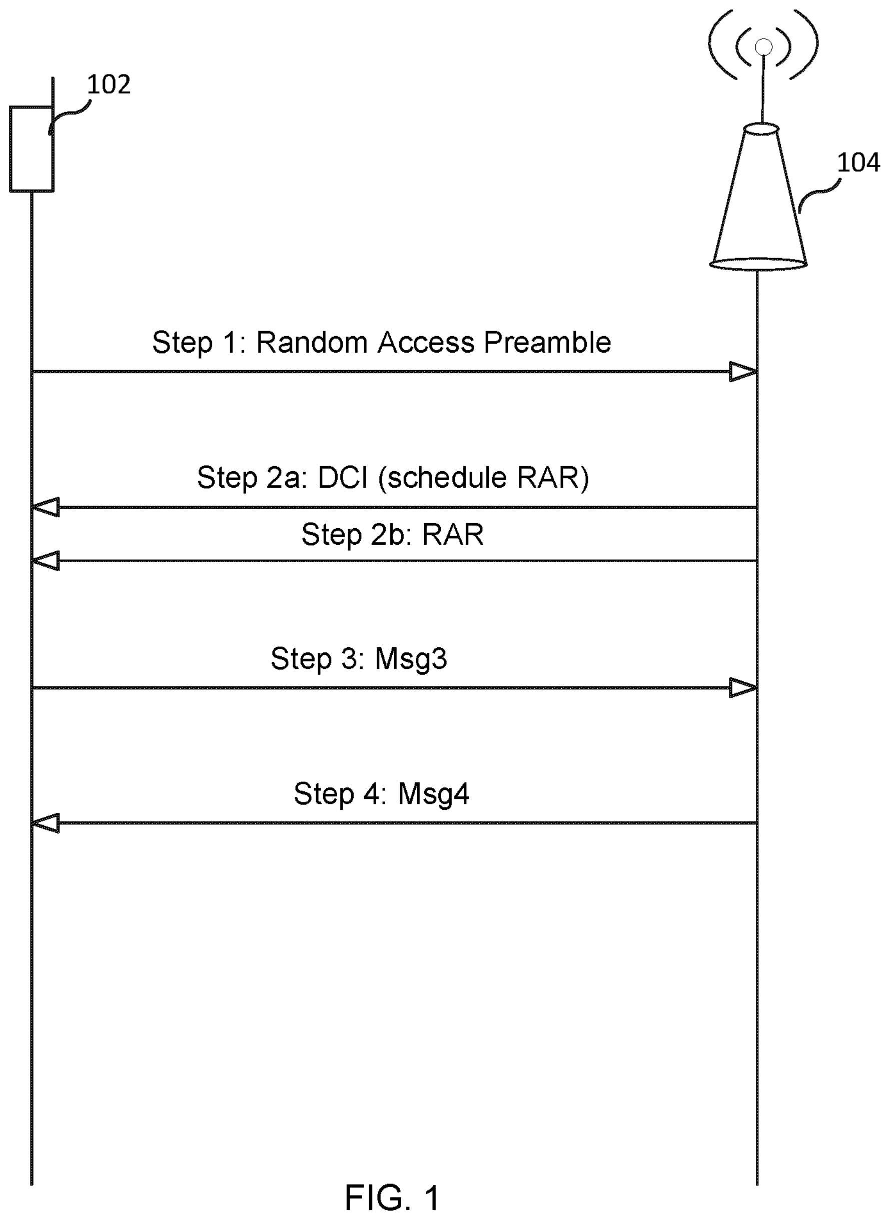
FIG. 1 illustrates a 4-step random access produce.
Figure 2:
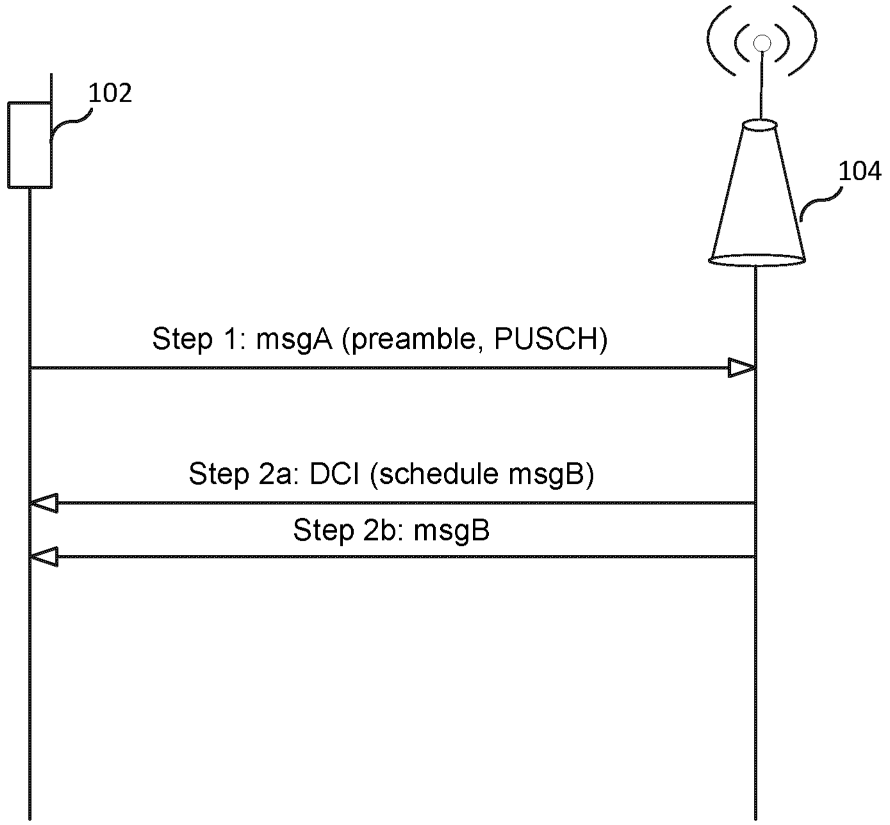
FIG. 2 illustrates a 2-step random access procedure.
Figure 3:
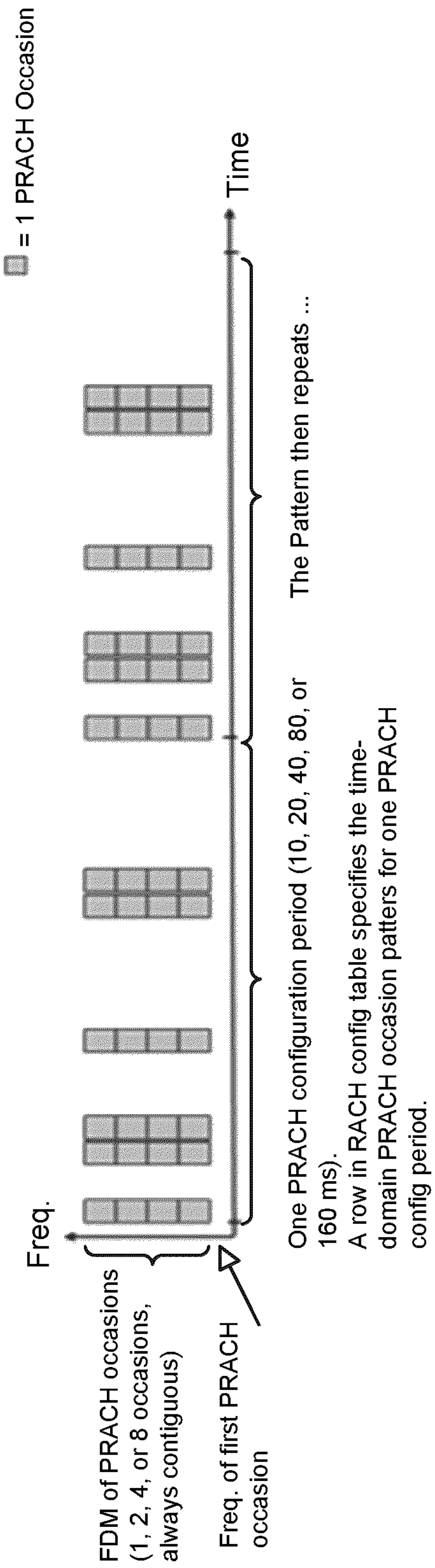
FIG. 3 shows an example of the PRACH occasion configuration in NR.
Figure 4:
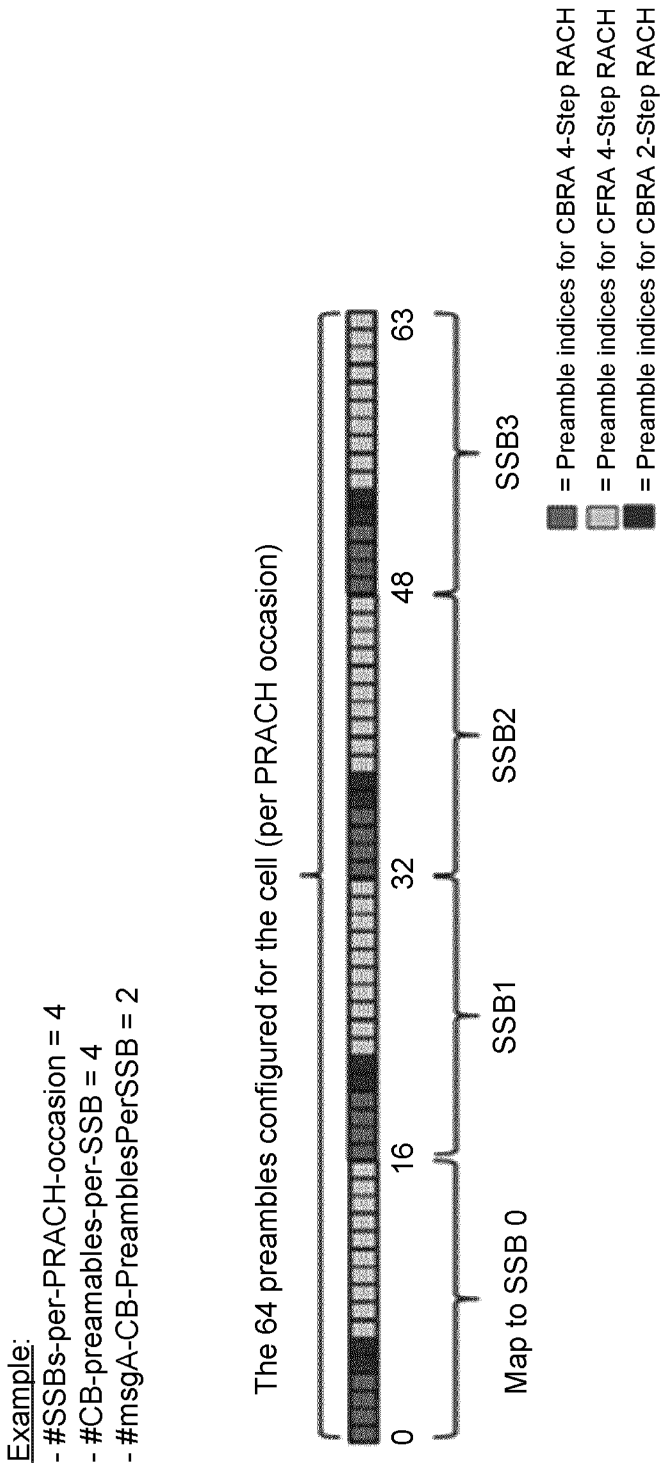
FIG. 4 shows an example of the SSB to PRACH occasion mapping
Figure 5:
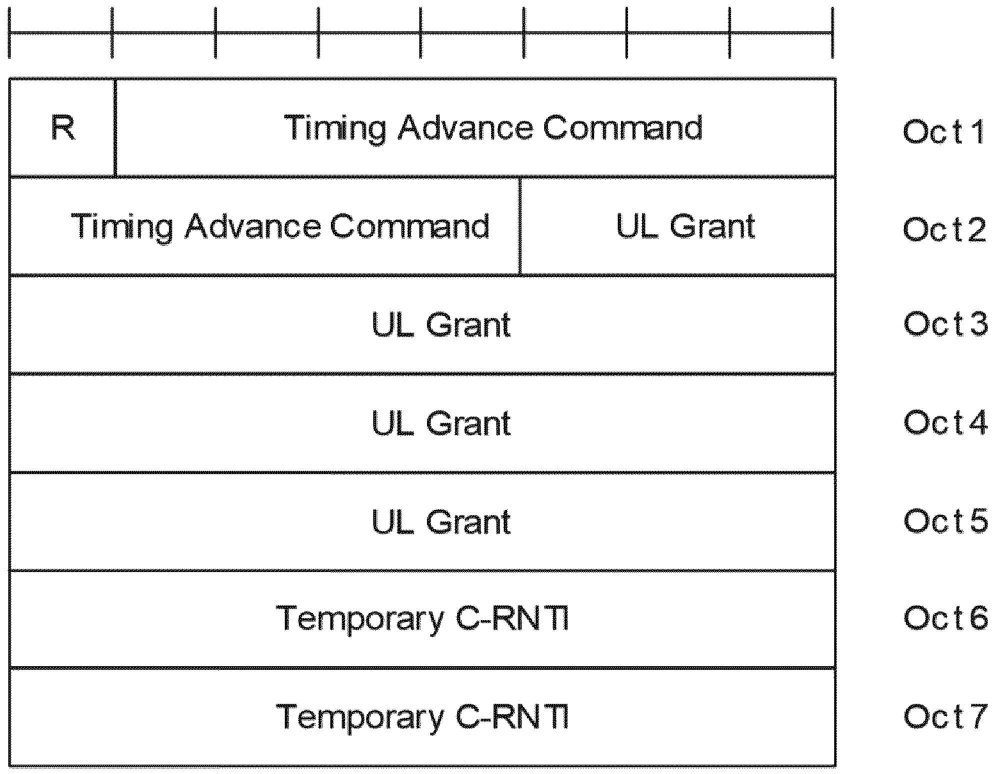
FIG. 5 shows the MAC RAR is octet aligned, and it provides the temporary C-RNTI for the message 3 and message 4.
Figure 6:
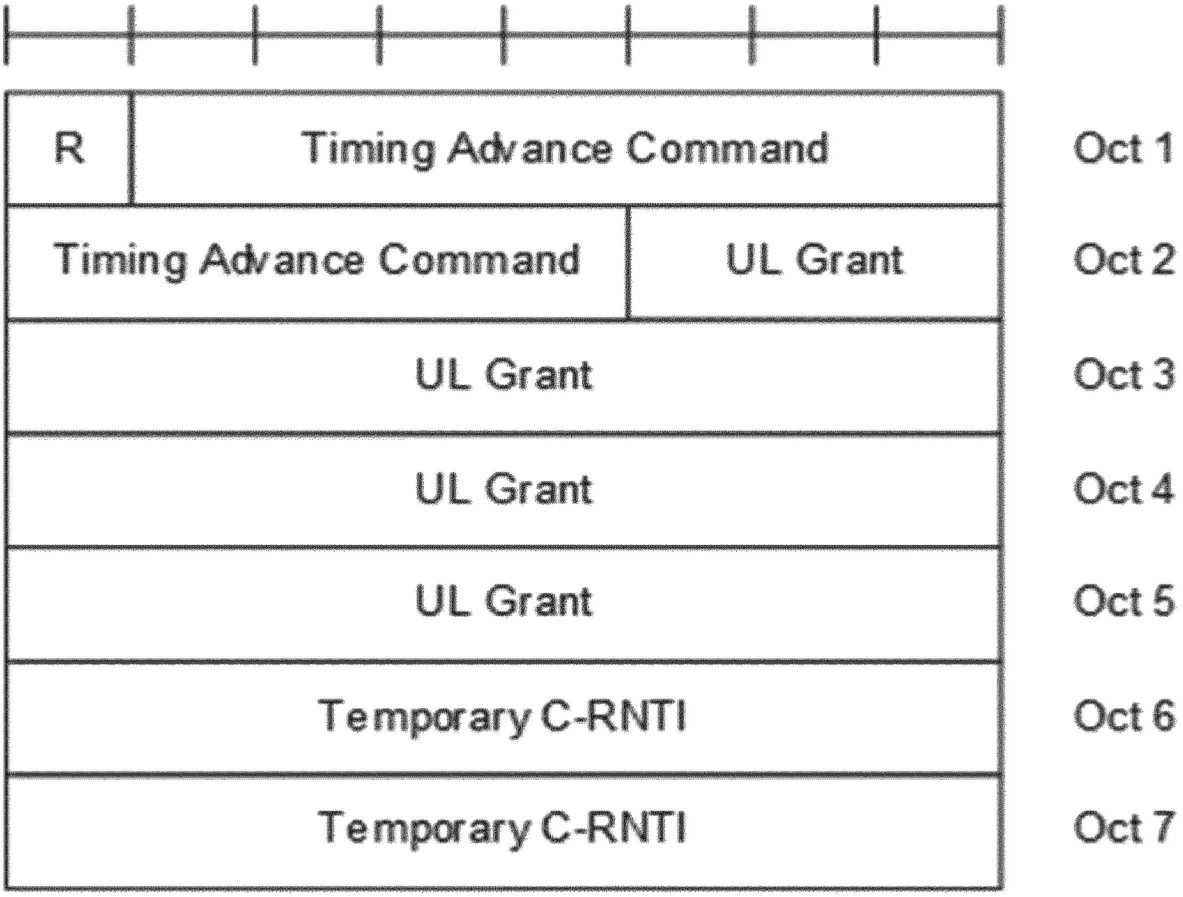
FIG. 6 shows the structure of a fallbackRAR.
Figure 7:
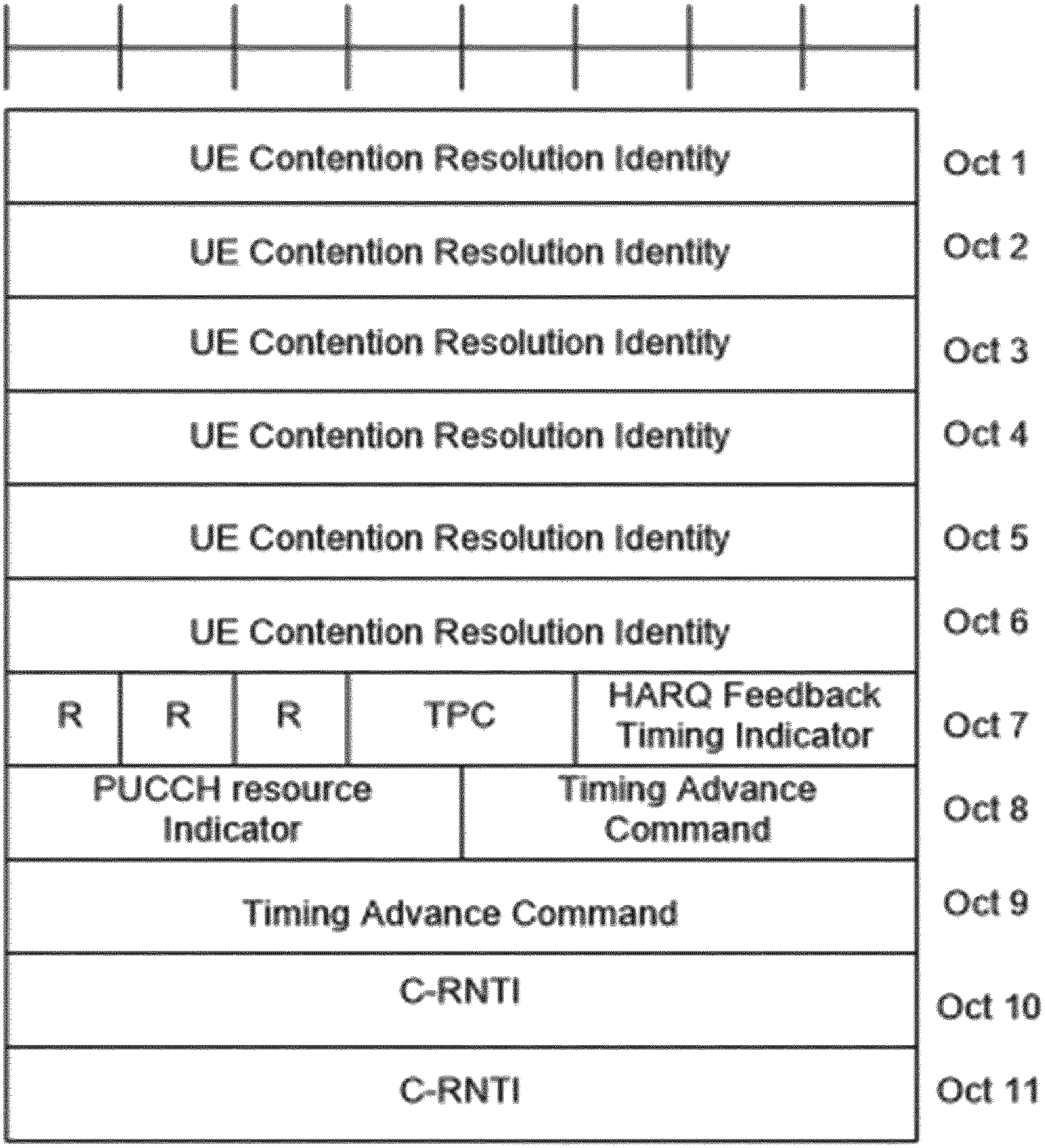
FIG. 7 shows the structure of a successRAR.

FIG. 1 illustrates a random access (RA) procedure being performed by a UE 102. This RA procedure can be used by UEs to establish a connection (e.g., a Radio Resource Control (RRC) connection) with a network node 104 (e.g., an access point, which is also known as a base station). The RA procedure shown in FIG. 1 is the 4-step RA procedure, also referred to as the Type-1 random access procedure in 3GPP TS 38.213, but other RA procedures exist (e.g., the 2-step RA procedure, which is shown in FIG. 2). In a first step, UE 102 initiates the RA procedure by transmitting a random-access preamble (RAP) (a.k.a., "Message 1" or "Msg 1") on the Physical Random Access Channel (PRACH). After detecting the Msg1, the network node 104 (e.g., a 5G base station (gNB)) responds by transmitting to the UE on the Physical Downlink Control Channel (PDCCH) Downlink Control Information (DCI) (e.g., DCI format 1_0) to prepare the UE to receive a random-access response (RAR) (a.k.a., "Message 2" or "Msg2") and then sends the RAR on the Physical Downlink Shared Channel (PDSCH). In the third step, after successfully decoding Msg2, the UE 102 continues the procedure by transmitting a message (a.k.a., "Message 3" or "Msg3") on the Physical Uplink Shared Channel (PUSCH). Msg3 is or contains an RRC connection establishment request. In the last step of the procedure, the gNB transmits a message (a.k.a., "Message 4" or "Msg4") on the Physical Downlink Shared Channel (PDSCH) for contention resolution. Msg3 includes a rrc-SetupRequest message, which contains the establishment-Cause Information Element (IE) which contains a value indicating the reason that caused the UE 102 to initiate the connection establishment, e.g., emergency call, mission critical services, multimedia priority services, etc. The network node 104 identifies the type of connection request being requested by UE 102 by decoding the establishment-Cause IE received in msg3, based on which, the network node 104 decides whether this request shall be admitted or rejected, based on the network traffic load situation and available resource in the network.

The 2-step random access produce, also referred to as Type-2 random access procedure in TS 38.213, is illustrated in FIG. 2. In the first step, a UE sends on the PUSCH a first message (MsgA) that includes a random access preamble together with higher layer data such as an RRC connection request possibly with some small payload. After detecting the MsgA, the access point sends to the UE DCI (e.g., DCI format 1_0) on the PDCCH and then sends an RAR (a.k.a., "MsgB") which includes a UE identifier assignment, timing advance information, contention resolution message, etc.

UEs are pre-configured to different groups depending on, for example, the UE or/and service priority level, or different service types, or different network slices. For example, different groups can be defined based on the UE Access Identity numbers or/and the Access Categories. As another example, different groups can be defined based on the network slice IDs. As another example, different groups can be defined based on the service type, e.g., MBB, Mission Critical Services, small data transmission (SDT), air-to-ground communications (A2G), etc.

A network node can configure different PRACH configurations for different UE/service groups that are associated to different priorities (e.g., different service types or different network slice IDs or different priority levels). A UE selects which configuration to use for random-access preamble transmission based on its associated group. By detection of the random-access preamble transmitted from a UE, the network node can identify the group to which the UE belongs (e.g., can identify the network slice ID or service type), and thereby making an early decision on differentiated admission control for this UE.

Figure 8:
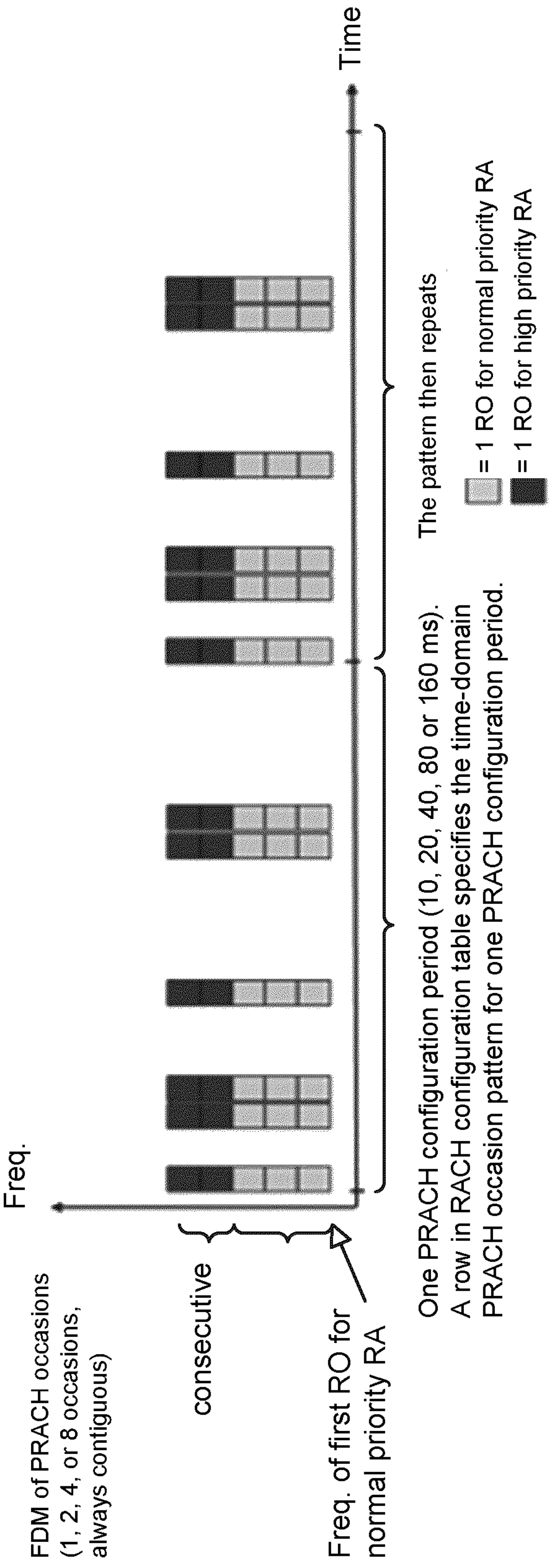
FIG. 8 shows an example where two sets of PRACH occasions are configured separately for normal priority and high priority UEs respectively, according to one embodiment.

For example, as illustrated in FIG. 8, two sets of PRACH occasions are configured separately for normal priority UEs (e.g., UEs having a service type included in a first group of service types) and high priority UEs respectively (e.g., UEs having a service type not included in the first group of service types), assuming 2 levels of UE priority are defined.

To be able to differentiate the $2^{nd}$ message when the PRACH occasions are separately configured, the following embodiments are described.

The examples below focus on the case that UE groups are defined based on the UE/Service priority level. The same method can be used for cases where the UE groups are defined based on the UE/service type, network slices IDs, etc.

1. Different RA-RNTI or MSGB-RNTI values for different PRACH occasion sets configured for UE priority or service priority.

1.1 Offsets

In one embodiment, an offset is added to generate different RA-RNTI or MSGB-RNTI values for different priority UEs. As an example, one offset is added to a RA-RNTI or MSGB-RNTI for the high priority UE if two priorities are defined, i.e. "normal priority UE" and "high priority UE", as shown below:

$$RARNTI_{highPrio} = RARNTI + RNTI_{offset} \text{ for 4-step } RA$$

$$MSGBRNTI_{highPrio} = MSGBRNTI + RNTI_{offset} \text{ for 2-step } RA$$

where the $RNTI_{offset}$ can depend on maximum value of the RA-RNTI or MSGB-RNTI according to the actual PRACH configuration (e.g., 2-step RA or 4-step RA) for the normal priority UE such that:

$$RNTI_{offset} = 14 \times 80 \times 8 \times 4 \text{ for 4-step } RA$$

$$RNTI_{offset} = 14 \times 80 \times 8 \times 6 \text{ for 2-step } RA$$

If more than 2 priorities are defined, different offset values can be added in the RNTI calculation to make sure that RNTI values for different priorities are unique.

In one example, when only the 4-step RACH is supported in the cell, the $RNTI_{offset}$ can be 14×80×8×2 for high priority UEs, i.e. MSGB-RNTI values used for legacy2-step RA is used by high priority UEs in this cell for 4-step RA procedure.

In another example, when only 2-step RACH is supported in the cell, the $RNTI_{offset}$ can be −14×80×8×2 for high priority UEs, i.e. the RA-RNTIs used for legacy 4-step RACH will be used for high priority UEs in this cell for 2-step RA procedure.

In one embodiment, an offset can be added to the ID of PRACH occasions in frequency domain f_id. As an example, two groups of PRACH occasions are separately configured, one for normal priority UEs, the other for high priority UEs, then the f_id_high for high priority UEs can be:

$$f\_id\_high = f\_id + f\_id\_offset$$

where the f_id is the PRACH occasion index in frequency domain for normal priority UEs, f_id_offset can be the number of PRACH occasions FDMed for normal priority UEs.

1.2 Include the PRACH Occasions for PRACH Preambles Corresponding to all Priority Classes when Calculating the RA-RNTI or MSGB-RNTI Although the PRACH Occasions May be Separately Configured As an example, the s_id, t_id, and f_id, as described above, which are used in calculating the RNTI, can be for the PRACH occasions for UEs with all priorities within one NR frame, i.e. 10 ms.

$$RA\text{-}RNTI = 1 + \text{s\_id} + 14\times\text{t\_id} + 14\times 80\times\text{f\_id} + 14\times 80\times 8\times\text{ul\_carrier\_id}$$

$$MSGB\text{-}RNTI = 1 + \text{s\_id} + 14\times\text{t\_id} + 14\times 80\times\text{f\_id} + 14\times 80\times 8\times\text{ul\_carrier\_id} + 14\times 80\times 8\times 2$$

Figure 9:
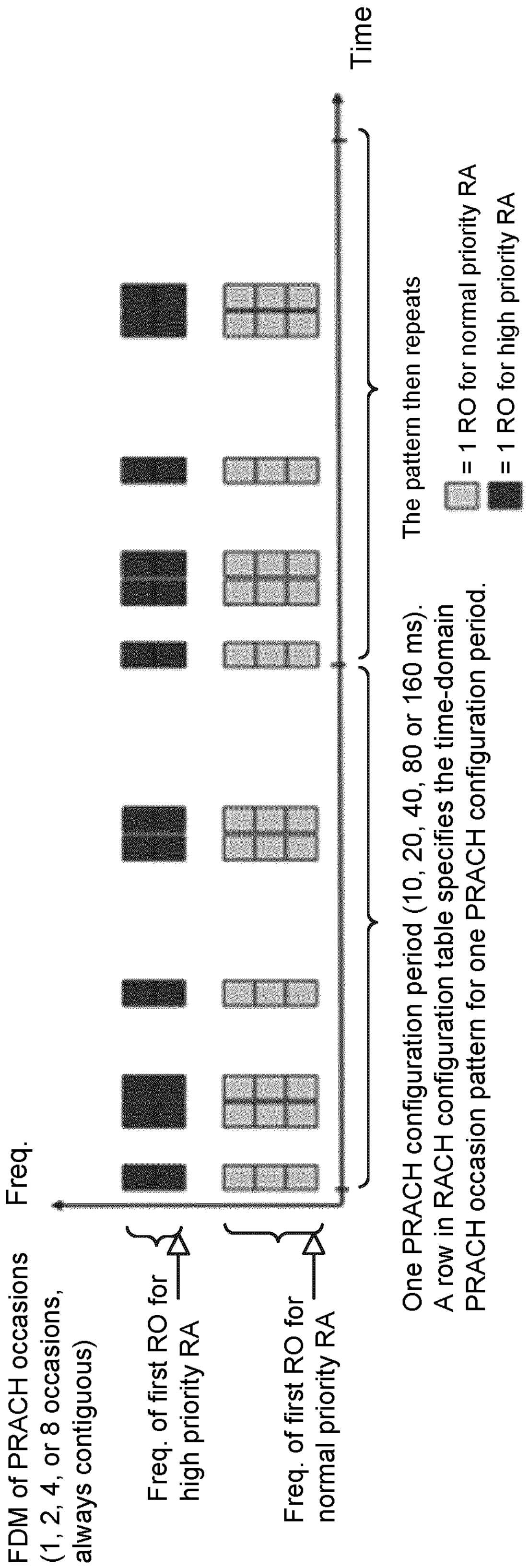
FIG. 9 shows an example where two sets of PRACH occasions are configured separately for normal priority and high priority UEs respectively, according to another embodiment.

For the number f_id, it can be numbered within a range of total possible PRACH occasions for all PRACH configurations for different UE priorities, e.g. in FIG. 9, two PRACH occasion sets are configured for 2 priorities of UEs, where f_id will be from 0 to 4, since there're totally 5 PRACH occasions (3 for normal priority RA, 2 for high priority RA) on different PRBs. Note that even if the high priority PRACH occasions do not overlap with normal priority PRACH occasions in time domain, the number of PRACH occasions FDMed are still 5 as long as they're not on the same PRBs.

In a variant of this embodiment, the network configures the number of FDMed PRACH occasions for legacy UEs (e.g. msg1-FDM in SIB1) and the number of FDMed PRACH occasions for high priority UEs (e.g., msg1-FDM-HighPriority in SIB1) such that the total number of PRACH occasions multiplexed in frequency for all priority levels (e.g., msg1-FDM+msg1-FDM-HighPriority) is less than or equal to 8.

In addition, the value of f_id to be used for deriving RA-RNTI or MSGB-RNTI for high priority UEs is defined as msg1-FDM<=f_id<msg1-FDM+msg1-FDM-HighPriority.

With this method, the formula of the RA-RNTI and MSGB-RNTI will not be changed.

In another variant of this embodiment, the maximum number of PRACH occasions in frequency for all UE priorities with different PRACH configurations is more than 8, in which case the formula will be updated according to the maximum number PRACH occasions on different PRBs, say F_ID_MAX:

$$RA\text{-}RNTI = 1\text{\_s\_id} + 14\times\text{t\_id} + 14\times 80\times\text{f\_id} + 14\times 80\times\text{F\_ID\_MAX}\times\text{ul\_carrier\_id}$$

$$MSGB\text{-}RNTI = 1 + \text{s\_id} + 14\times\text{t\_id} + 14\times 80\times\text{f\_id} + 14\times 80\times\text{F\_ID\_MAX}\times\text{ul\_carrier\_id} + 14\times 80\times\text{F\_ID\_MAX}\times 2.$$

In some sub-embodiment of this variant, the maximum number of PRACH occasions on different PRBs for all UE priorities with different PRACH configurations may be determined based on the number of PRACH configurations.

For example, for each PRACH configuration, the maximum number of PRACH occasions is 8, and the total number PRACH occasions multiplexed in frequency can be 8*N PRACH occasions, where N is the number of PRACH configurations for different priority of UEs or services. E.g. the RNTI can be calculated in below formulas, where F_ID_MAX_PerRACHConfig means maximum number of ROs per PRACH configuration, and N is the number of PRACH configurations:

$$RA\text{-}RNTI = 1 + \text{s\_id} + 14\times\text{t\_id} + 14\times 80\times\text{f\_id} + 14\times 80\times\text{F\_ID\_MAX\_PerRACHConfig}\; x\, N\times\text{ul\_carrier\_id};$$

$$MSGB\text{-}RNTI = 1 + \text{s\_id} + 14\times\text{t\_id} + 14\times 80\times\text{f\_id} + 14\times 80\times\text{F\_ID\_MAX\_PerRACHConfig}\; x\, N\times\text{ul\_carrier\_id} + 14\times 80\times\text{F\_ID\_MAX\_PerRACHConfig}\; x\, N\times 2.$$

Note that even for the case where different UE priorities share the same PRACH occasion configuration but are differentiated by using different sets of preamble indexes per PRACH occasion, it can be still be beneficial to use the above proposed methods to design different RA-RNTI or MSGB-RNTI values for different UE priorities. By doing so, the transmission of RARs associated to different UE priorities can be scheduled and handled independently.

2. The Same RA-RNTI or MSGB-RNTI is Allowed for Different PRACH Occasion Sets Configured for Different UE or Service Priorities If the legacy equations for calculating the value of RA-RNTI or MSGB-RNTI are reused for all levels of UE priorities, then, differentiation of the Msg2 or MsgB transmission for different priority UEs can be enabled by either adding priority level indication in the DCI scheduling Msg2/MsgB, or adding priority level indication in associated RAR.

2.1 Indicate the UE or Service Priority Level in a DCI Scheduling RAR or msgB With this method, a UE can check both the RA-RNTI/MSGB-RNTI value and the priority indication field in the DCI to determine whether the PDCCH is expected for scheduling its corresponding RAR.

As an example of embodiment 3, shown below, a 2-bit field "Priority level" is added in the DCI to indicate the priority of the UE/Service.

UE-Priority field can be defined in below table and included in the DCI, where the large the value is, the higher the priority is.

| Priority level | |
|---|---|
| 0 | Normal |
| 1 | Priority 3 |
| 2 | Priority 2 |
| 3 | Priority 1 |

The following information is transmitted by means of the DCI format 1_0 (with CRC scrambled by RA-RNTI or msgB-RNTI):

Frequency domain resource assignment - $\lceil \log_2(N_{RB}^{DL,BWP}(N_{RB}^{DL,BWP}+1)/2) \rceil$ bits;

$N_{RB}^{DL,BWP}$ is the size of CORESET 0 if CORESET 0 is configured for the cell and $N_{RB}^{DL,BWP}$ is the size of initial DL bandwidth part if CORESET 0 is not configured for the cell;

Time domain resource assignment - 4 bits as defined in Clause 5.1.2.1 of TS 38.214;

VRB-to-PRB mapping - 1 bit according to Table 7.3.1.2.2-5;

Modulation and coding scheme - 5 bits as defined in Clause 5.1.3 of TS 38.214, using Table 5.1.3.1-1;

TB scaling - 2 bits as defined in Clause 5.1.3.2 of TS 38.214;

LSBs of SFN - 2 bits for the DCI format 1_0 with CRC scrambled by msgB-RNTI or 2 bits as defined in Clause 8 of TS 38.213 for operation in a cell with shared spectrum channel access; 0 bit otherwise;

Priority level - 2 bits to indicate the priority of the UE to which the RAR is targeted;

Reserved bits - 12 bits for the DCI format 1_0 with CRC scrambled by msgB-RNTI or for operation in a cell with shared spectrum channel access; otherwise 14 bits.

2.2 A UE Monitors all Possible RA-RNTI Addressed or MsgB-RNTI Addressed PDCCHs in Order to Decode its Associated RAR/MsgB This means when multiple PRACH configurations are configured, UE needs to determine the maximum number of PDCCHs with CRC scrambled by same RA-RNTI or MSGB-RNTI value to be monitored within the RAR window, based on the PRACH configurations from the network. UE will continue monitor the PDCCHs for RAR until the maximum number of PDCCHs reached or until an expected RAR (e.g. associated to its priority level or associated to its UE ID) is decoded.

As an example, in FIG. 9, assuming we number the ROs in frequency domain to be RO 0, RO 1, RO 2, RO 3, RO4 from the lower frequency to high frequency, RO 0, RO1, RO2 are configured for normal priority UEs, RO 3 and RO 4 are configured for high priority UEs. If a high priority UE selects an RO 3 for a 4-step random access, then same RA-RNTI addressed RARs may be received from normal priority UEs on RO 0 since RO 3 and RO 0 have same values of s_id, t_id, and f_id in the formula for RA-RNTI calculation as described in section 2.1.4.1. In this case, the added priority level indication field in the DCI, as mentioned in a previous embodiment, can be used for a UE to determine if the scheduled Msg2/MsgB contains the RAR associated to itself.

2.3. Multiplex all RARs with the Same RA-RNTI or MsgB-RNTI in the Same PDSCH in Response to the 1st Message on Different ROs with Different PRACH Configurations for Different Priority of UEs With this method, multiple RAR messages for all UEs with different priorities will be multiplexed in one PDSCH when same RA-RNTI or MSGB-RNTI is calculated, and the RAR determination can be based on the received RAR messages.

For example, the RAR message can be differentiated based on one or more of the following: 1) a priority ID in RAR; 2) a contention resolution ID or C-RNTI (contention resolution ID and C-RNTI are available in success RAR in 2-step RACH, which are carried in MsgA PUSCH); 3) Preamble ID if the preamble IDs for different priorities of UEs are different; 4) Different RAR MAC subheader for different UE priorities (e.g., include priority information in the subheader); 5) a priority specific scrambling of PDSCH used for RAR, such that normal priority PDSCH for RAR is scrambled as in release 15 and 16, while higher than normal priority PDSCH will have another scrambling (legacy UEs will be able to only decode normal priority RAR, while UEs with this feature will be able to decode RAR by using new defined descrambling; and can be scrambling of all bits of the payload in PDSCH or only scrambling of only the CRC in PDSCH for RAR).

3. CORESET and CSS Configurations

According to current NR standard, the control resource set (CORESET) configuration(s) for RA procedure (RAR/Msg3 retransmission/Msg4) can be configured by the RACH configuration in SIB1. If not configured in SIB1, then, CORESET 0 is used as the default CORESET for RA procedure. In addition, Type1 common search space (CSS) for RA procedure can be configured in SIB1. If not configured in SIB1, then, Type0 CSS is used as the default search space for RA procedure. Here, the CORESET is defined as a set of physical resources in time and frequency that is used to carry PDCCH. A CCS for RA procedure is a set of PDCCH candidates that a UE must monitor for decoding the downlink control information (DCI) that contains scheduling information on the transmission of the RACH related messages (i.e., Msg2, Msg3 retransmission, Msg4).

In an embodiment, to support RAR differentiation, different CORESETs or/and different CSSs can be configured for different RA procedures triggered by different UEs/services or for different RA procedures in different network slices.

As an example, a new default CSS (i.e., different from the Type 0 CSS) is defined in the standard for RA procedure associated to a certain UE/service type, or a certain UE/service priority, or a certain network slice ID.

As another example, bes_ides the CSS in SIB1 for legacy RACH configuration, a new CSS is configured in SIB1 for RA procedure associated to a certain UE/service type, or a certain priority, or a certain network slice ID.

As another example, a new default CORESET (i.e., different from the CORESET 0) is defined in the standard for RA procedure associated to a certain UE/service type, or a certain UE/service priority, or a certain network slice ID.

As another example, bes_ides the CORESET configuration filed in SIB1 for legacy RACH configuration, a new CORESET is configured in SIB1 for RA procedure associated to a certain UE/service type, or a certain priority, or a certain network slice ID.

Depending on how many different RAR configurations are needed, the methods mentioned in the above four examples can be combined.

Figure 20:
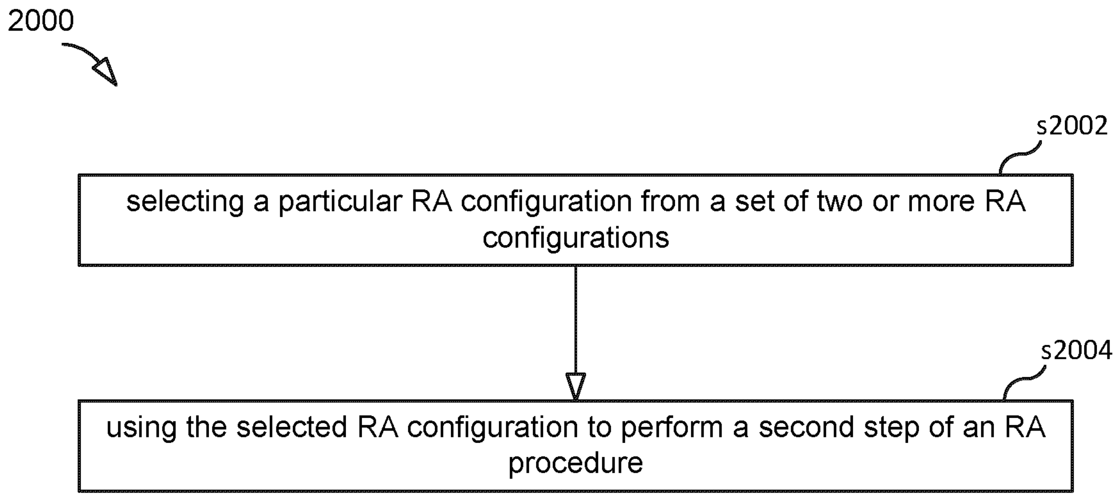
FIG. 20 is a flowchart illustrating a process according to some embodiments.

FIG. 20 is a flowchart illustrating a process 2000, according to some embodiments, that is performed by a communication device (e.g., UE 102 or access point 104). Process 2000 may begin in step s2002. Step s2002 comprises the communication device selecting an RA configuration from a set of two more RA configurations, wherein the set of RA configurations comprises at least one of: i) common search space, CSS, information identifying a set of two or more CSSs, or ii) a set of two or more control resource set, CORESET, configurations, and selecting the RA configuration comprises selecting a CSS from the set of two or more CSS or selecting a CORESET configuration from the set of two or more CORESET configurations. Step s2004 comprises the communication device using the selected RA configuration to perform a second step of an RA procedure.

In some embodiments, the selecting of the RA configuration is based on a priority level, service type, or network slice identifier.

In some embodiments, the set of RA configurations comprises the CSS information, and the set of CSSs comprises: a first CSS associated with a first service type and a second CSS that is not associated with the first service type. In some embodiments, the set of RA configurations comprises the set of CORESET configurations, and the set of CORESET configurations comprises: a first CORESET configurations associated with the first service type and a second CORESET configurations that is not associated with the first service type.

In some embodiments, the communication device is a UE, the detects a need to obtain a service of the first service type, and as a result of the UE detecting the need to obtain the service of the first service type, the UE selects the first CSS or the UE selects the first CORESET configuration.

In some embodiments, the method also includes the UE detecting a need to establish a connection with an access point in order to obtain the service of the first service type; and the UE performing a first step of the RA procedure by transmitting (s1008) an RA preamble to the access point.

In some embodiments, using the selected RA configuration to perform the second step of the RA procedure comprises: after transmitting the RA preamble, the UE using the selected RA configuration to monitor a downlink control channel for downlink control information, DCI, transmitted by the access point in response to the access point receiving the RA preamble transmitted by the UE.

In some embodiments, the UE selected the first CSS as a result of the UE detecting a need to obtain a service of the first service type, the selected CSS specifies a set of Physical Downlink Control Channel, PDCCH, candidates, using the selected RA configuration to monitor a downlink control channel for the DCI comprises using the selected CSS to monitor the downlink control for the DCI, and using the selected CSS to monitor the downlink control channel comprises the UE monitoring the PDCCH candidates specified by the selected CSS.

In some embodiments, the UE selected the first CORESET configuration as a result of the UE detecting a need to obtain a service of the first service type, the selected CORESET configuration specifies a set of search space configurations, using the selected RA configuration to monitor the downlink control channel for the DCI comprises using the selected CORESET configuration to monitor the downlink control for the DCI, and using the selected CORESET configuration to monitor the downlink control channel for DCI comprises the UE monitoring at least one of the search space configurations specified by the selected CORESET configuration.

In some embodiments, the communication device is an access point, the method further comprises the access point detecting that a UE seeks to obtain a service of the first service type, and, as a result of the access point detecting that a UE seeks to obtain a service of the first service type, the access point selects the first CSS or selects the first CORESET configuration. In some embodiments, detecting that the UE seeks to obtain a service of the first service type comprises determining that the UE transmitted a RA preamble using a Physical Random Access Channel, PRACH, configuration associated with the first service type. In some embodiments, using the selected RA configuration to perform the second step of the RA procedure comprises the access point using the selected RA configuration to transmit, on a downlink control channel, DCI. In some embodiments, the access point selected the first CSS as a result of detecting that the UE seeks to obtain a service of the first service type, the selected CSS specifies a set of Physical Downlink Control Channel, PDCCH, candidates, using the selected RA configuration to transmit the DCI comprises using the selected CSS to transmit the DCI, and using the selected CSS to transmit the DCI comprises the access point using at least a selected one of the PDCCH candidates to transmit the DCI.

In some embodiments, the access point selected the first CORESET configuration as a result of detecting that the UE seeks to obtain a service of the first service type, the selected CORESET configuration specifies a set of search space configurations, and using the selected RA configuration to transmit the DCI comprises the access point using at least a selected one of the search space configurations to transmit the DCI.

In some embodiments, the first service type is a small data transmission, SDT, service.

Summary of Various Embodiments

Figure 10:
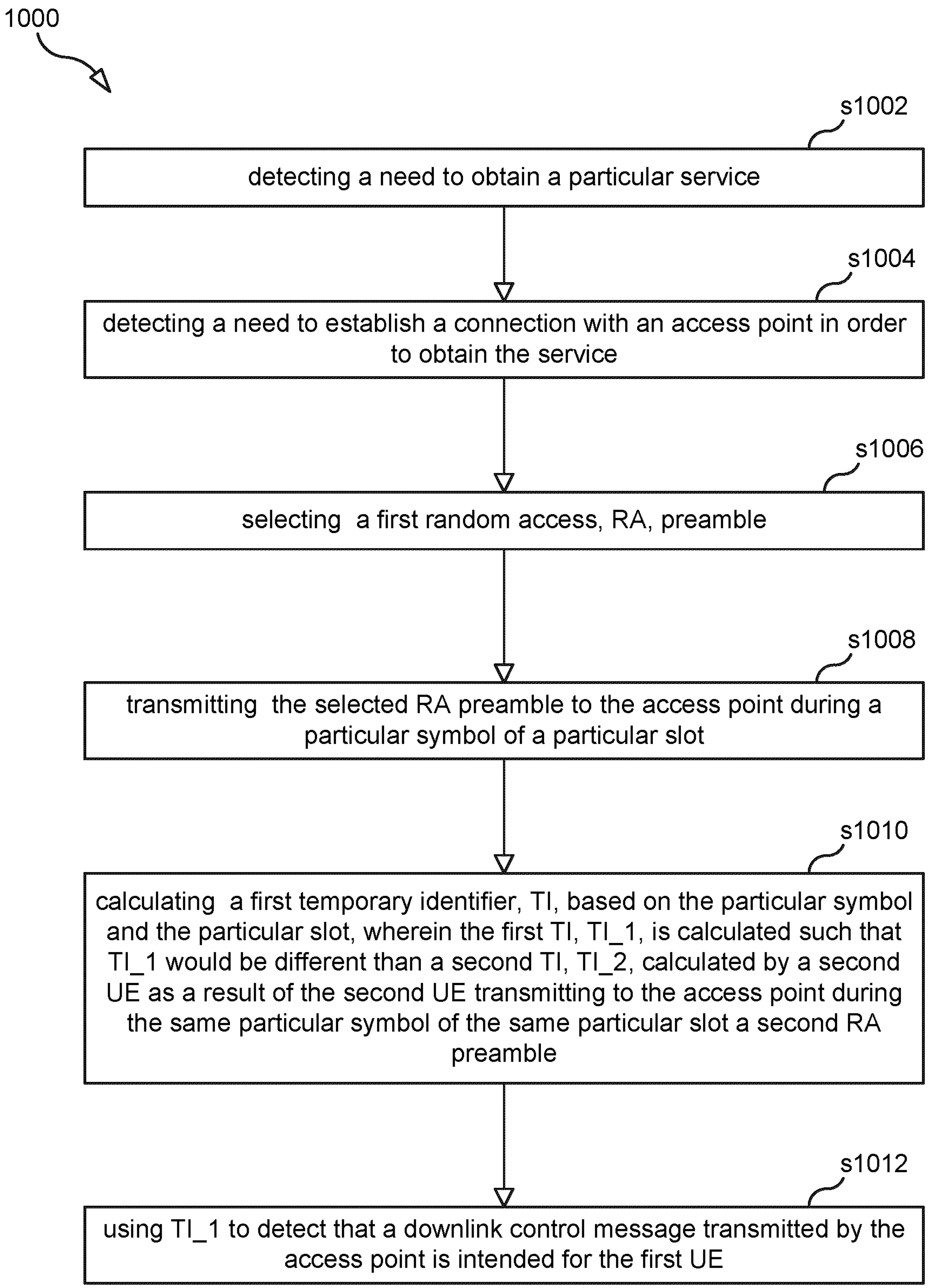
FIG. 10 is a flowchart illustrating a process according to some embodiments.

A1. A method (1000, see FIG. 10) performed by a first user equipment, UE (104), for establishing a connection with an access point (e.g., gNB), the method comprising: the first UE detecting (s1002) a need to obtain a particular service (e.g., a mission critical service or connect to a particular network slice); the first UE detecting (s1004) a need to establish a connection with an access point (e.g., gNB) in order to obtain the particular service (e.g., a mission critical service); the first UE selecting (s1006) a first random access, RA, preamble; the first UE transmitting (s1008) the selected RA preamble to the access point during a particular symbol of a particular slot; the first UE calculating (s1010) a first temporary identifier, TI, (e.g., an RA-RNTI), based on the particular symbol and the particular slot, wherein the first TI, TI_1, is calculated such that TI_1 would be different than a second TI, TI_2, calculated by a second UE as a result of the second UE transmitting to the access point during the same particular symbol of the same particular slot a second RA preamble; and the first UE using TI_1 to detect that a downlink control message (e.g., DCI) transmitted by the access point is intended for the first UE (s1012).

A2. The method of embodiment A1, wherein $TI\_1=TI\_2+TI_{off}$, where $TI_{off}$ is a predetermined offset value.

A3. The method of embodiment A2, wherein: $TI\_2=a+(b\times s\_id)+(c\times t\_id)+(d\times f\_id)+(e\times ul\_c\_id)$, or $TI\_2=a+(b\times s\_id)+(c\times t\_id)+(d\times f\_id)+(e\times ul\_c\_id)+f$, and wherein s_id is a symbol index, t_id is a slot index, f_id is a Physical Random Access Channel (PRACH) occasion frequency index, ul_c_id is 0 or 1, a is in integer greater than or equal to 1, b is in integer greater than or equal to 1, c is in integer greater than or equal to 1, d is in integer greater than or equal to 1, e is in integer greater than or equal to 1, and f is in integer greater than or equal to 1.

A4. the method of embodiment A3, wherein calculating TI_1 comprises calculating: $TI\_1=a+(b\times s\_id)+(c\times t\_id)+(d\times f\_id)+(e\times ul\_c\_id)+TI_{off}$, or $TI\_1=a+(b\times s\_id)+(c\times t\_id)+(d\times f\_id)+(e\times ul\_c\_id)+f+TI_{off}$.

A5. The method of any one of embodiments A1-A4 wherein $TI_{off}=(14\times 80\times 8\times 4)$, or $TI_{off}=(14\times 80\times 8\times 6)$.

A6. The method of embodiment A1, wherein calculating TI_1 comprises: $TI\_1=a+(b\times s\_id)+(c\times t\_id)+(d\times(f\_id+f_{Off}))+(e\times ul\_c\_id)$, or $TI\_1=a+(b\times s\_id)+(c\times t\_id)+(d\times(f\_id+f_{Off}))+(e\times ul\_c\_id)+f$, and wherein s_id is the index of the particular symbol, t_id is the index of the particular slot, f_id is the index of the particular PRACH occasion in the frequency domain that was used by the first UE to transmit the first RA preamble, $f_{Off}$ is a predefined offset value, ul_c_id is 0 or 1, a is in integer greater than or equal to 1, b is in integer greater than or equal to 1, c is in integer greater than or equal to 1, d is in integer greater than or equal to 1, e is in integer greater than or equal to 1, and f is in integer greater than or equal to 1.

A7. The method of embodiment A6, wherein 0≤f_id<f_id_max, and f_id_max is the total number of PRACH occasions that are frequency multiplexed for UEs associated with the particular service.

A8. The method of embodiment A6 or A7, wherein $f_{Off}$ is the total number of PRACH occasions that are frequency multiplexed for UEs associated with normal services.

A9. The method of embodiment A1, wherein calculating TI_1 comprises calculating: TI_1=a+(b×s_id)+(c×t_id)+(d×f_id)+(e×ul_c_id), or TI_1=a+(b×s_id)+(c×t_id)+(d×f_id)+(e×ul_c_id)+f, wherein s_id is the index of the particular symbol, t_id is the index of the particular slot, f_id is the index of the particular PRACH occasion in the frequency domain that was used by the first UE to transmit the first RA preamble and f_id is greater than or equal to msg1-FDM and f_id is less than (msg1-FDM+msg1-FDM-HighPriority), msg1-FDM is the total number of PRACH occasions that are frequency multiplexed for UEs associated with normal services, msg1-FDM-HighPriority is the total number of PRACH occasions that are frequency multiplexed for UEs associated with the particular service, ul_c_id is 0 or 1, a is in integer greater than or equal to 1, b is in integer greater than or equal to 1, c is in integer greater than or equal to 1, d is in integer greater than or equal to 1, e is in integer greater than or equal to 1, and f is in integer greater than or equal to 1.

A10. The method of embodiment A9, wherein e=14×80×8, or e=14×80× F_ID_MAX, where F_ID_MAX is the total number of PRACH occasions multiplexed in the frequency domain, or e=14×80× F_ID_MAX× N, where F_ID_MAX is the total number of PRACH occasions multiplexed in the frequency domain per PRACH configuration and N is the total number of PRACH configurations.

A1 1. The method of embodiment A10, wherein N is equal to a total number of supported priority levels.

A12. The method of any one of embodiments A3-A12, wherein 0≤s_id<14, 0≤t_id<80, a=1, b=1, c=14, d=1120, e=8960, and f=17920.

Figure 11:
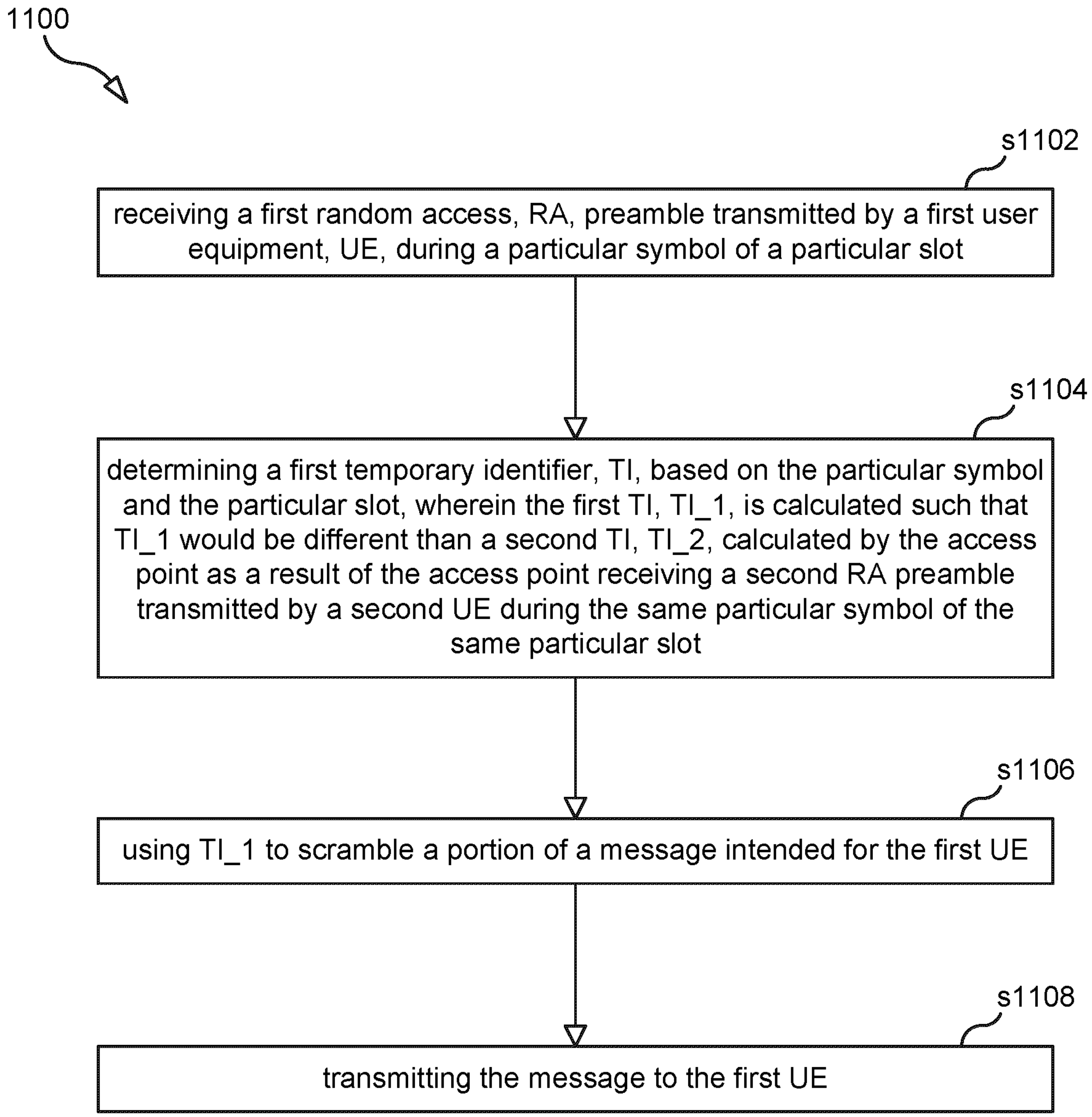
FIG. 11 is a flowchart illustrating a process according to some embodiments.

B1. A method (1100, see FIG. 11) performed by an access point (104) (e.g., gNB), the method comprising: the access point receiving (s1102) a first random access, RA, preamble transmitted by a first user equipment, UE, during a particular symbol of a particular slot; the access point determining (s1104) a first temporary identifier, TI, (e.g., an RA-RNTI), based on the particular symbol and the particular slot, wherein the first TI, TI_1, is calculated such that TI_1 would be different than a second TI, TI_2, calculated by the access point as a result of the access point receiving a second RA preamble transmitted by a second UE during the same particular symbol of the same particular slot; the access point using TI_1 to scramble a portion of a message (e.g., the CRC of a DCI) intended for the first UE (s1106); and the access point transmitting (s1108) the message to the first UE.

B2. The method of embodiment B2, wherein determining TI_1 comprises: the access point determining whether the first UE has used a PRACH configuration reserved for one or more particular services (e.g., any service included in a particular grouping of one or more services) to transmit the RA preamble; and determining TI_1 by calculating TI_1 using a first procedure if it is determined that the first UE has used the PRACH configuration reserved for the one or more particular services to transmit the RA preamble, otherwise calculating TI_1 using a second procedure.

B3. The method of embodiment B2, wherein calculating TI_1 using the first procedure comprises: calculating TI_1=a+(b×s_id)+(c×t_id)+(d×f_id)+(e×ul_c_id)+$TI_{off}$, or calculating TI_1=a+(b×s_id)+(c×t_id)+(d×f_id)+(e×ul_c_id)+f+$TI_{off}$, wherein s_id is the index of the particular symbol, t_id is the index of the particular slot, f_id is the index of the particular PRACH occasion in the frequency domain that was used by the first UE to transmit the first RA preamble, ul_c_id is 0 or 1, $TI_{off}$ is a predetermined offset, a is in integer greater than or equal to 1, b is in integer greater than or equal to 1, c is in integer greater than or equal to 1, d is in integer greater than or equal to 1, e is in integer greater than or equal to 1, and f is in integer greater than or equal to 1.

B4. The method of embodiment B3, wherein $TI_{off}$=(14×80×8×4), or $TI_{off}$=(14×80×8×6).

B5. The method of embodiment B2, wherein calculating TI_1 using the first procedure comprises: calculating TI_1=a+(b×s_id)+(c×t_id)+(d×(f_id+$f_{Off}$))+(e×ul_c_id), or calculating TI_1=a+(b×s_id)+(c×t_id)+(d×(f_id+$f_{Off}$))+(e×ul_c_id)+f, and wherein s_id is the index of the particular symbol, t_id is the index of the particular slot, f_id is the index of the particular PRACH occasion in the frequency domain that was used by the first UE to transmit the first RA preamble, $f_{Off}$ is a predefined offset value, ul_c_id is 0 or 1, a is in integer greater than or equal to 1, b is in integer greater than or equal to 1, c is in integer greater than or equal to 1, d is in integer greater than or equal to 1, e is in integer greater than or equal to 1, and f is in integer greater than or equal to 1.

B6. The method of embodiment B5, wherein 0≤f_id<f_id_max, and f_id_max is the total number of PRACH occasions that are frequency multiplexed for UEs associated with one of the one or more particular services.

B7. The method of embodiment B5 or B6, wherein $f_{Off}$ is the total number of PRACH occasions that are frequency multiplexed for UEs associated with normal services (i.e., a service that is not included in the particular grouping of one or more services).

B8. The method of embodiment B2, wherein calculating TI_1 using the first procedure comprises: calculating TI_1=a+(b×s_id)+(c×t_id)+(d×f_id)+(e×ul_c_id), or calculating TI_1=a+(b×s_id)+(c×t_id)+(d×f_id)+(e×ul_c_id)+f, wherein s_id is the index of the particular symbol, t_id is the index of the particular slot, f_id is the index of the particular PRACH occasion in the frequency domain that was used by the first UE to transmit the first RA preamble and f_id is greater than or equal to msg1-FDM and f_id is less than (msg1-FDM+msg1-FDM-HighPriority), msg1-FDM is the total number of PRACH occasions that are frequency multiplexed for UEs associated with normal services, msg1-FDM-HighPriority is the total number of PRACH occasions that are frequency multiplexed for UEs associated with one of the one or more particular services, ul_c_id is 0 or 1, a is in integer greater than or equal to 1, b is in integer greater than or equal to 1, c is in integer greater than or equal to 1, d is in integer greater than or equal to 1, e is in integer greater than or equal to 1, and f is in integer greater than or equal to 1.

B9. The method of embodiment B8, wherein e=14×80×8, or e=14×80×F_ID_MAX, where F_ID_MAX is the total number of PRACH occasions multiplexed in the frequency domain, or e=14×80×F_ID_MAX×N, where F_ID_MAX is the total number of PRACH occasions multiplexed in the frequency domain per PRACH configuration and N is the total number of PRACH configurations.

B10. The method of embodiment B9, wherein N is equal to a total number of supported priority levels.

B11. The method of any one of embodiments B3-B10, wherein 0≤s_id<14, 0≤t_id<80, a=1, b=1, c=14, d=1120, e=8960, and f=17920.

Figure 12:
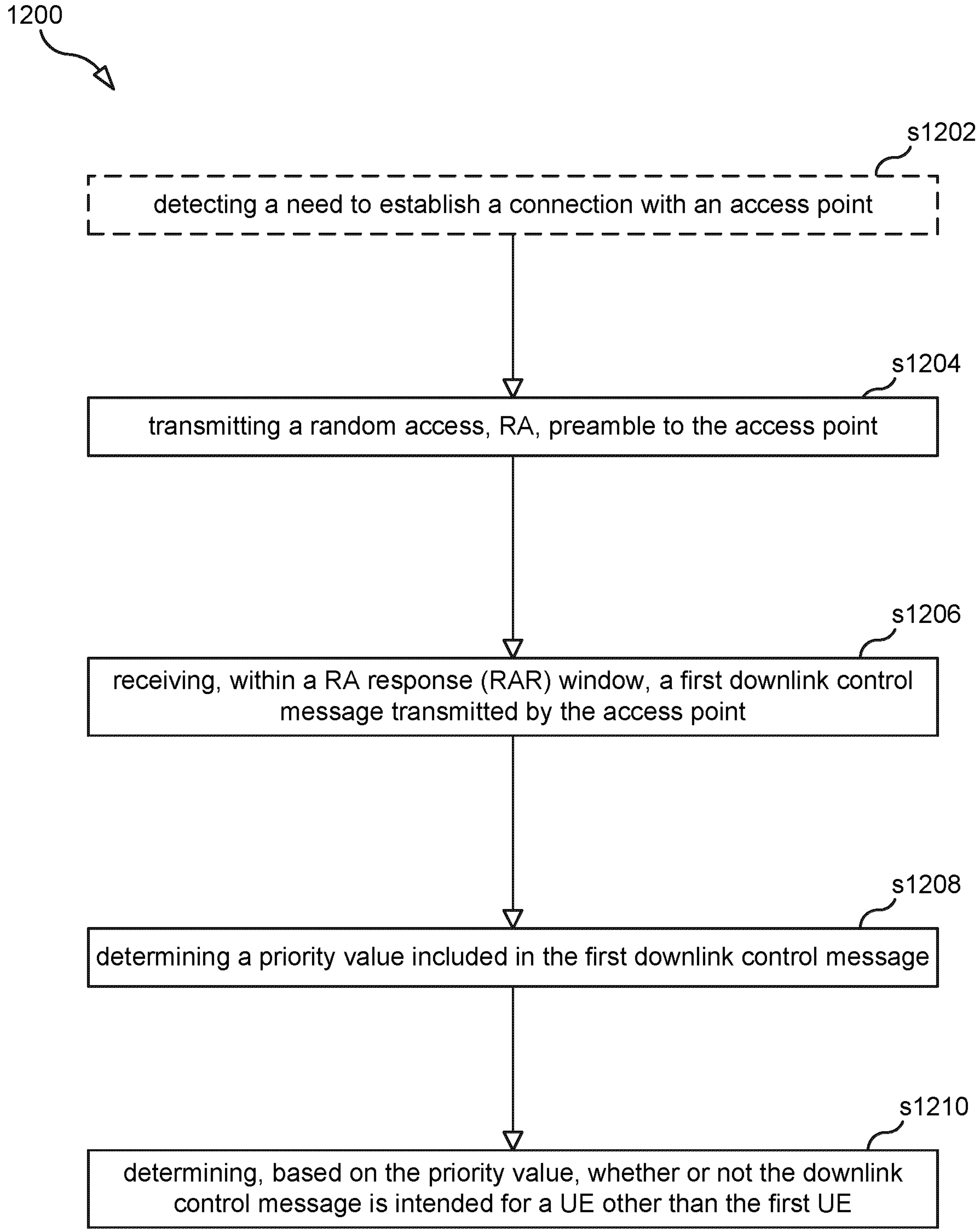
FIG. 12 is a flowchart illustrating a process according to some embodiments.

C1. A method (1200, see FIG. 12) performed by a first user equipment, UE, for establishing a connection with an access point (e.g., gNB), the method comprising: the first UE transmitting (s1204) a random access, RA, preamble to the access point (generally, prior to this step s1204, the UE detects (s1202) a need to establish a connection with the access point); the first UE receiving (s1206), within a RA response (RAR) window, a first downlink control message (e.g., DCI) transmitted by the access point; the first UE determining (s1208) a priority value included in the first downlink control message; and the first UE determining (s1210), based on the priority value, whether or not the downlink control message is intended for a UE other than the first UE.

C2. The method of embodiment C1, further comprising the first UE searching for a second downlink control message within the RAR window as a result of determining that the downlink control message is intended for a UE other than the first UE.

C3. The method of embodiment C2, wherein the first UE terminates the search for the second downlink control message as a result of determining that a configured time search window has expired (e.g., determining that a particular timer has expired).

Figure 13:
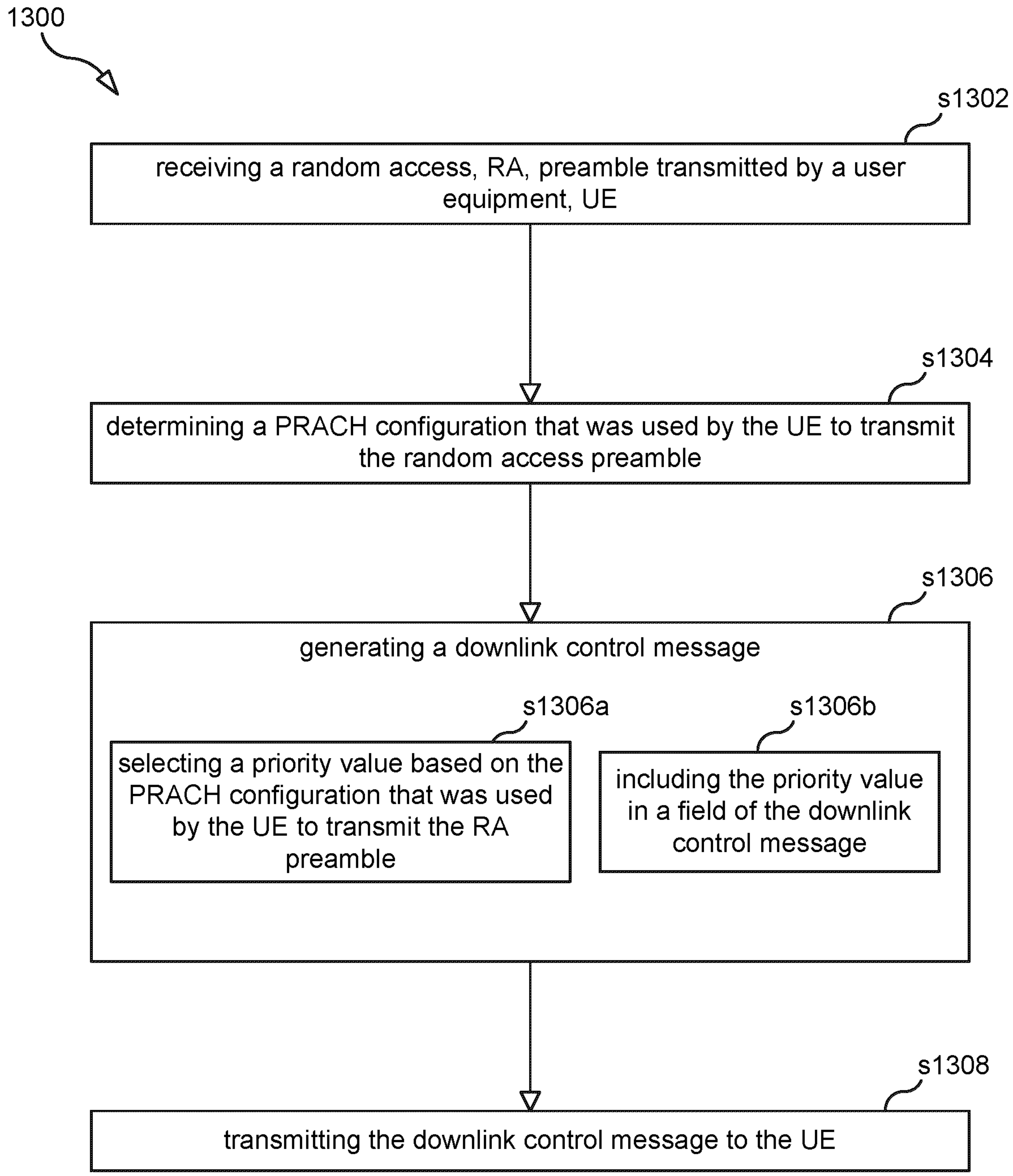
FIG. 13 is a flowchart illustrating a process according to some embodiments.

D1. A method (1300, see FIG. 13) performed by an access point (104) (e.g., gNB), the method comprising: receiving (s1302) a random access, RA, preamble transmitted by a user equipment, UE; determining (s1304) a PRACH configuration that was used by the UE to transmit the random access preamble; generating (s1306) a downlink control message (e.g., DCI); and transmitting (s1308) the downlink control message to the UE, wherein generating the downlink control message comprises: selecting (s1306*a*) a priority value based on the PRACH configuration that was used by the UE to transmit the RA preamble; and including (s1306*b*) the priority value in a field of the downlink control message.

D2. The method of embodiment D1, wherein determining the PRACH configuration that was used by the UE comprises or consists of determining a set of preambles to which the preamble transmitted by the UE belongs (e.g., determining whether the preamble transmitted by the UE is included in a set of preambles dedicated to high priority UEs).

E1. A method (1400, see FIG. 14) performed by a first user equipment, UE (104), for establishing a connection with an access point (104) (e.g., gNB), the method comprising: the first UE transmitting (s1404) a random access, RA, preamble to the access point (generally, prior to this step s1404, the UE detects (s1402) a need to establish a connection with the access point); the first UE receiving (s1406) a first RA response transmitted by the access point; the first UE determining (s1408) a priority value associate with the received first RA response; and the first UE determining (s1410), based on the priority value, whether or not the first RA response is intended for a UE other than the first UE.

E2. The method of embodiment E1, wherein determining a priority value associate with the received RA response comprises determining a priority value included in the RA response.

E3. The method of embodiment E1, wherein determining a priority value associate with the received RA response comprises determining whether a priority specific scrambling was used to transmit the RA response.

E4. The method of any one of embodiments E1-E3, wherein receiving the first RA response comprise receiving an RA message comprising: i) the first RA response and a ii) second RA response.

E5. The method of embodiment E4, further comprising the first UE, as a result of determining that the first RA response is not intended for the first UE, further performing the steps of: determining a second priority value associate with the received second RA response; and determining, based on the second priority value, whether or not the second RA response is intended for a UE other than the first UE.

Figure 15:
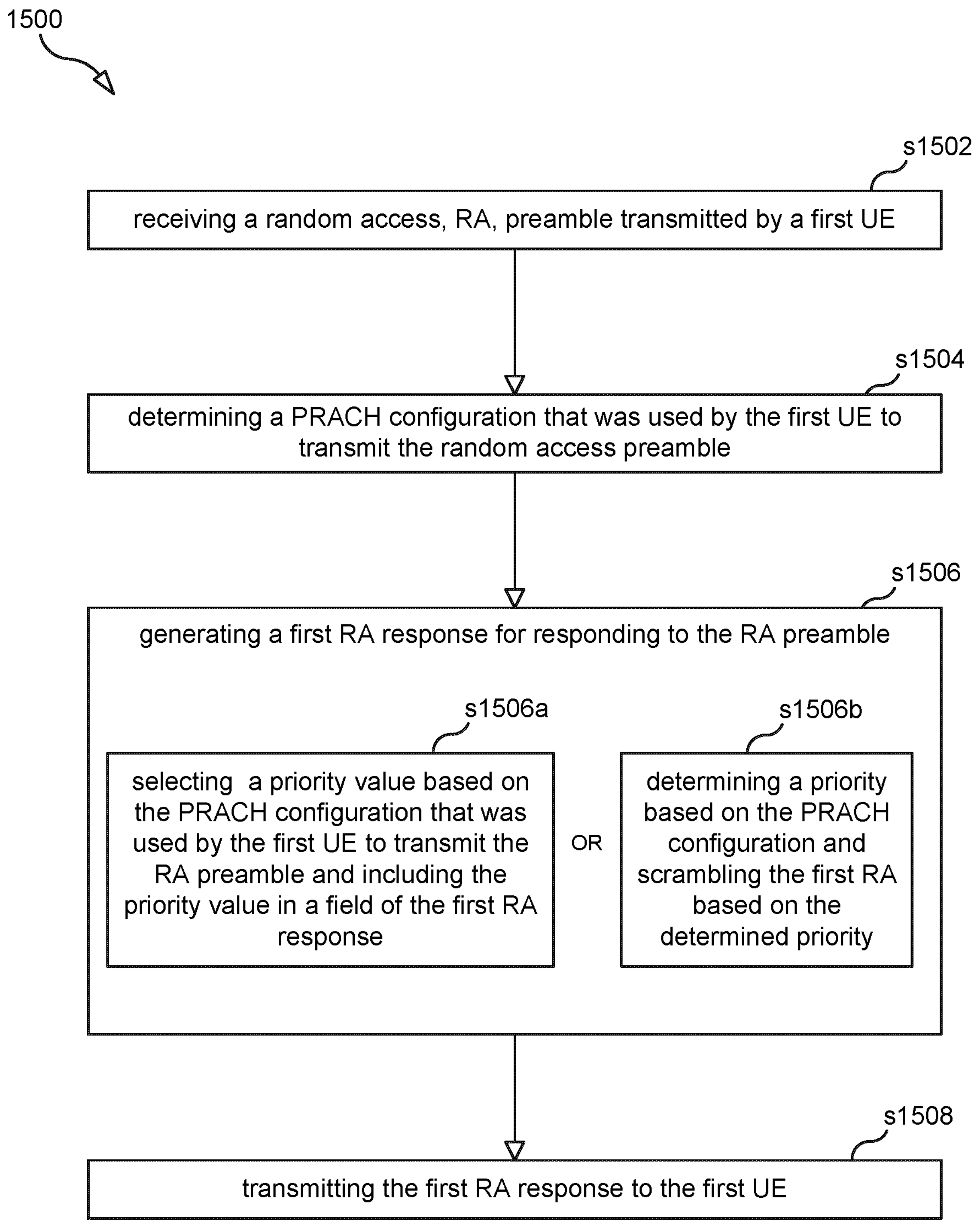
FIG. 15 is a flowchart illustrating a process according to some embodiments.

F1. A method (1500, see FIG. 15) performed by an access point (104) (e.g., gNB), the method comprising: receiving (s1502) a random access, RA, preamble transmitted by a first user equipment, UE (102); determining (s1504) a PRACH configuration that was used by the first UE to transmit the random access preamble (e.g., determining the PRACH configuration that was used by the UE comprises or consists of determining a set of preambles to which the preamble transmitted by the UE belongs); generating (s1506) a first RA response for responding to the RA preamble; and transmitting (s1508) the first RA response to the first UE, wherein generating (s1506) the first RA response comprises: selecting (s1506*a*) a priority value based on the PRACH configuration that was used by the first UE to transmit the RA preamble and including the priority value in a field of the first RA response; or determining (s1506*b*) a priority based on the PRACH configuration and scrambling the first RA based on the determined priority.

F2. The method of embodiment F1, wherein transmitting the first RA response comprises transmitting the first RA response on a physical downlink shared channel (PDSCH).

F3. The method of embodiment F2, wherein transmitting the first RA response comprises transmitting on the PDSCH an RA message comprising i) the first RA response and ii) a second RA response for a second UE that has a different priority than the first UE.

F4. The method of embodiment F3, further comprising, prior to transmitting the RA message on the PDSCH, transmitting a control message (e.g., DCI) comprising information identifying a PDSCH resource that will be used to transmit the message on the PDSCH.

F5. The method of embodiment F1-F4, wherein determining the PRACH configuration that was used by the UE comprises or consists of determining a set of preambles to which the preamble transmitted by the UE belongs (e.g., determining whether the preamble transmitted by the UE is included in a set of preambles dedicated to high priority UEs).

Figure 16:
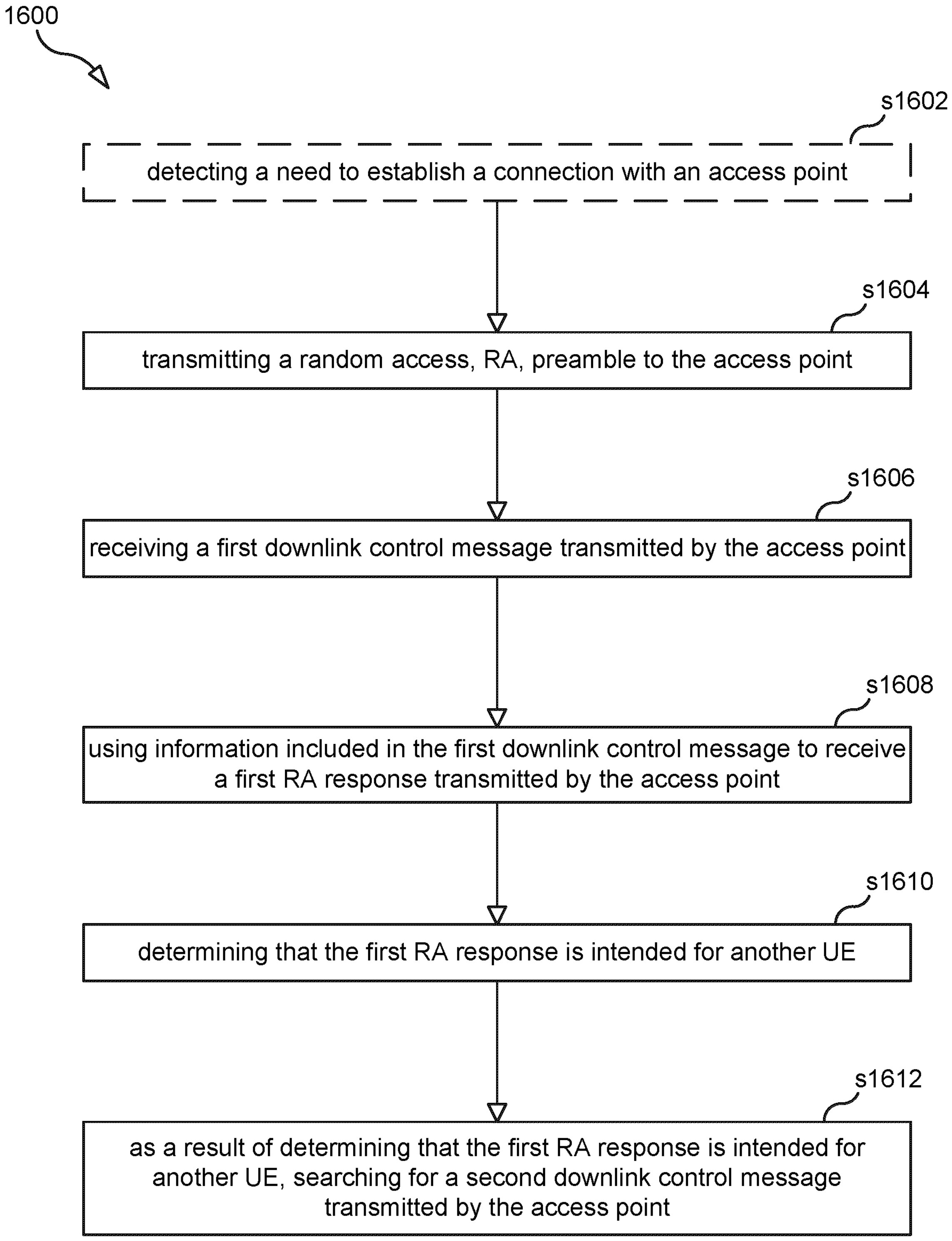
FIG. 16 is a flowchart illustrating a process according to some embodiments.

G1. A method (1600, see FIG. 16) performed by a first user equipment, UE (102), for establishing a connection with an access point (104) (e.g., gNB), the method comprising: the first UE transmitting (s1604) a random access, RA, preamble to the access point (generally, prior to this step s1604, the UE detects (s1602) a need to establish a connection with the access point); the first UE receiving (s1606) a first downlink control message (e.g., DCI) transmitted by the access point; the first UE using (s1608) information included in the first downlink control message to receive a first RA response transmitted by the access point; the first UE determining (s1610) that the first RA response is intended for another UE; and as a result of determining that the first RA response is intended for another UE, the first UE searching (s1612) for a second downlink control message transmitted by the access point.

G2. The method of embodiment G1, further comprising: the UE receiving the second downlink control message; the first UE using information included in the second downlink control message to receive a second RA response transmitted by the access point; the first UE determining that the second RA response is intended for the UE.

G3. The method of embodiment G2, further comprising: the UE using information included in the second RA response to transmit a connection request to the access point.

G4. The method of embodiment G1, wherein the first UE continues searching for a downlink control message transmitted by the access point until the first UE's corresponding RA response is detected or the configured maximum number of downlink control message detections is reached or a configured time widow for monitoring the downlink control message is expired.

H1. A method (1900, see FIG. 19A) performed by UE 102, the method comprising: selecting (step s1902) a particular control resource set (CORESET) configuration from a set of two or more default CORESET configurations; and using (step s1904) the selected CORESET configuration to perform a random access channel (RACH) procedure.

H2. A method (1910, see FIG. 19B) performed by UE 102, the method comprising: selecting (step s1912) a particular common search space (CSS) from a set of two or more default CSSs; and using (step s1914) the selected CSS to perform a random access channel (RACH) procedure. H3. The method of embodiment H1 or H2, wherein the selecting is based on a priority level, service type, or network slice identifier.

I1. A method (s1920, see FIG. 19C) performed by access point 104, the method comprising: broadcasting (step s1922) a system information block (SIB) comprising: i) a first control resource set (CORESET) configuration for use by UEs belonging to a first group of UEs when performing a Random Access Channel (RACH) procedure and ii) a second CORESET configuration for use by a UEs belonging to a second group of UEs when performing the RA procedure.

I2. A method (s1930, see FIG. 19D) performed by access point 104, the method comprising: broadcasting (step s1932) a system information block (SIB) comprising: i) first common search space (CSS) information identifying a first CSS for use by UEs belonging to a first group of UEs when performing a Random Access Channel (RACH) procedure and ii) a second CSS information identifying a second CSS for use by a UEs belonging to a second group of UEs when performing the RA procedure.

I3. The method of embodiment I1 or I2, wherein the first group of UEs consists of UEs having a normal priority or associated with normal services and the second group of UE consists of UEs having a not-normal priority or associated with a particular service.

Figure 17:
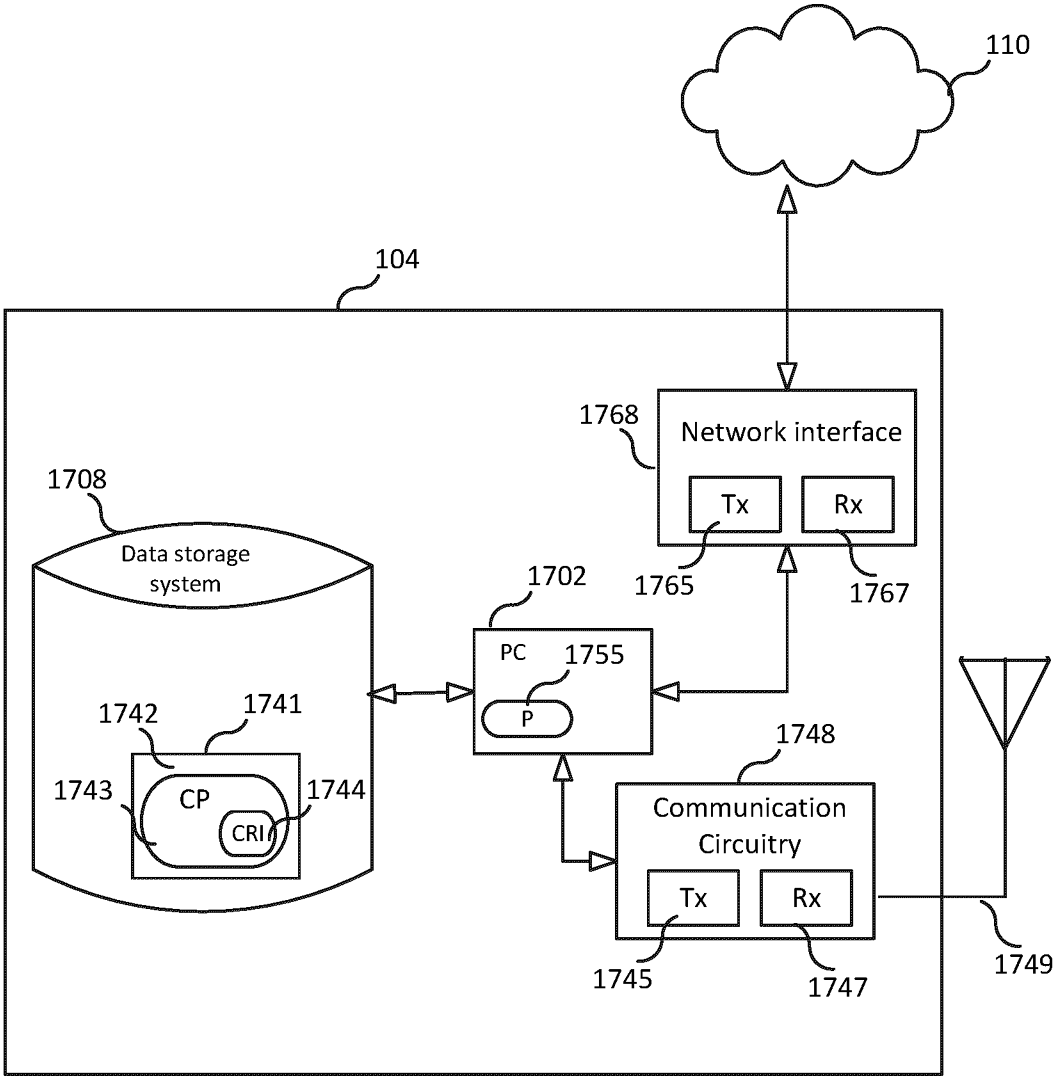
FIG. 17 illustrates a network node according to some embodiments.

FIG. 17 is a block diagram of network node 104, according to some embodiments, for performing network node methods disclosed herein. As shown in FIG. 17, network node 104 may comprise: processing circuitry (PC) 1702, which may include one or more processors (P) 1755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., network node 104 may be a distributed computing apparatus); at least one network interface 1768 comprising a transmitter (Tx) 1765 and a receiver (Rx) 1767 for enabling network node 104 to transmit data to and receive data from other nodes connected to a network 110 (e.g., an Internet Protocol (IP) network) to which network interface 1768 is connected; communication circuitry 1748, which is coupled to an antenna arrangement 1749 comprising one or more antennas and which comprises a transmitter (Tx) 1745 and a receiver (Rx) 1747 for enabling network node 104 to transmit data and receive data (e.g., wirelessly transmit/receive data); and a local storage unit (a.k.a., "data storage system") 1708, which may include one or more non-volatile storage devices and/or one or more volatile storage devices. In embodiments where PC 1702 includes a programmable processor, a computer program product (CPP) 1741 may be provided. CPP 1741 includes a computer readable medium (CRM) 1742 storing a computer program (CP) 1743 comprising computer readable instructions (CRI) 1744. CRM 1742 may be a non-transitory computer readable medium, such as, magnetic media (e.g., a hard disk), optical media, memory devices (e.g., random access memory, flash memory), and the like. In some embodiments, the CRI 1744 of computer program 1743 is configured such that when executed by PC 1702, the CRI causes network node 104 to perform steps described herein (e.g., steps described herein with reference to the flow charts). In other embodiments, network node 104 may be configured to perform steps described herein without the need for code. That is, for example, PC 1702 may consist merely of one or more ASICs. Hence, the features of the embodiments described herein may be implemented in hardware and/or software.

Figure 18:
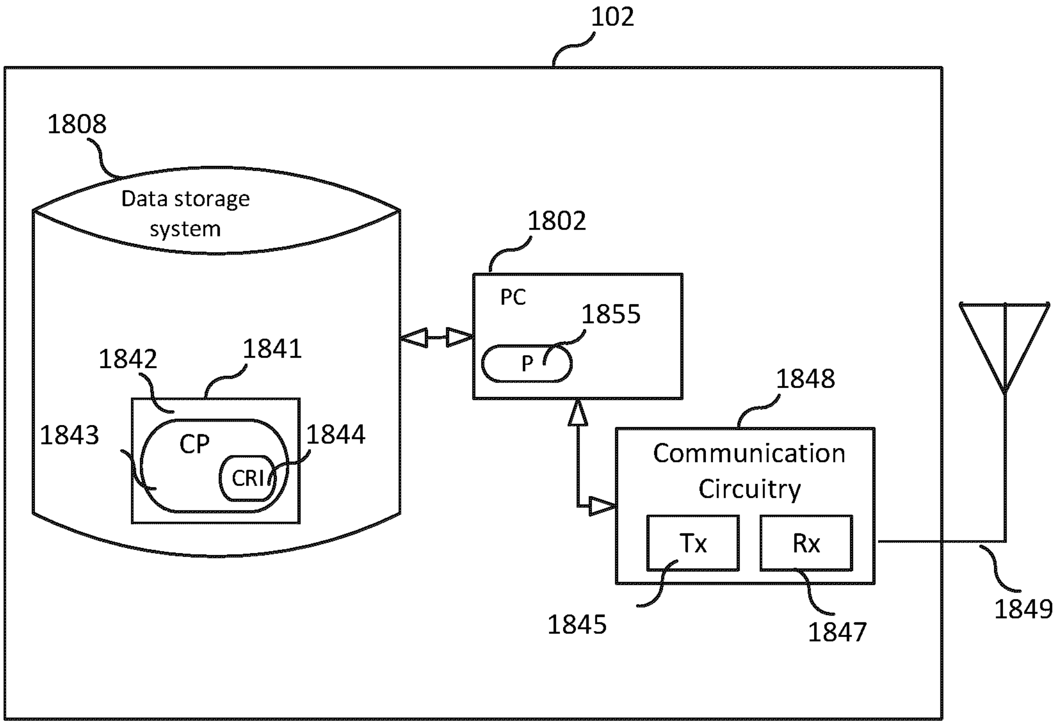
FIG. 18 illustrates a UE according to some embodiments.

FIG. 18 is a block diagram of UE 102, according to some embodiments. As shown in FIG. 18, UE 102 may comprise: processing circuitry (PC) 1802, which may include one or more processors (P) 1855 (e.g., one or more general purpose microprocessors and/or one or more other processors, such as an application specific integrated circuit (ASIC), field-programmable gate arrays (FPGAs), and the like); communication circuitry 1848, which is coupled to an antenna arrangement 1849 comprising one or more antennas and which comprises a transmitter (Tx) 1845 and a receiver (Rx) 1847 for enabling UE 102 to transmit data and receive data (e.g., wirelessly transmit/receive data); and a local storage unit (a.k.a., "data storage system") 1808, which may include one or more non-volatile storage devices and/or one or more volatile storage devices. In embodiments where PC 1802 includes a programmable processor, a computer program product (CPP) 1841 may be provided. CPP 1841 includes a computer readable medium (CRM) 1842 storing a computer program (CP) 1843 comprising computer readable instructions (CRI) 1844. CRM 1842 may be a non-transitory computer readable medium, such as, magnetic media (e.g., a hard disk), optical media, memory devices (e.g., random access memory, flash memory), and the like. In some embodiments, the CRI 1844 of computer program 1843 is configured such that when executed by PC 1802, the CRI causes UE 102 to perform steps described herein (e.g., steps described herein with reference to the flow charts). In other embodiments, UE 102 may be configured to perform steps described herein without the need for code. That is, for example, PC 1802 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a communication device, the method comprising:

the communication device detecting a need to establish a connection with an access point in order to obtain a first service of a first service type;

the communication device, after detecting the need to establish the connection with the access point, performing a first step of a random access (RA) procedure by transmitting an RA preamble to the access point;

selecting an RA configuration from a set of two more RA configurations, wherein the set of RA configurations comprises: i) common search space (CSS) information identifying a set of two or more CSSs, and/or ii) a set of two or more control resource set (CORESET) configurations, and selecting the RA configuration comprises selecting a CSS from the set of two or more CSSs or selecting a CORESET configuration from the set of two or more CORESET configurations; and using the selected RA configuration to perform a second step of an RA procedure, wherein i) the set of RA configurations comprises the CSS information, and the set of two or more CSSs comprises: a first CSS associated with the first service type of the first service and a second CSS that is not associated with the first service type of the first service, or ii) the set of RA configurations comprises the set of two or more CORESET configurations, and the set of two or more CORESET configurations comprises: a first CORESET configurations associated with the first service type of the first service and a second CORESET configurations that is not associated with the first service type of the first service, and further wherein i) the communication device selects the first CSS associated with the first service type of the first service as a result of the communication detecting a need to obtain the first service, or ii) the communication device selects the first CORESET configuration associated with the first service type of the first service as a result of the communication device detecting a need to obtain the first service.

2. The method of claim 1, wherein using the selected RA configuration to perform the second step of the RA procedure comprises:

after transmitting the RA preamble, the communication device using the selected RA configuration to monitor a downlink control channel for downlink control information (DCI) transmitted by the access point in response to the access point receiving the RA preamble transmitted by the UE.

3. The method of claim 2, wherein the communication device selected the first CSS as a result of the communication device detecting a need to obtain the first service, the selected CSS specifies a set of Physical Downlink Control Channel (PDCCH) candidates, using the selected RA configuration to monitor the downlink control channel for the DCI comprises using the selected CSS to monitor the downlink control for the DCI, and using the selected CSS to monitor the downlink control channel for DCI comprises the communication device monitoring the PDCCH candidates specified by the selected CSS.

4. The method of claim 2, wherein the communication device selected the first CORESET configuration as a result of the communication device detecting a need to obtain a the first service, the selected CORESET configuration specifies a set of search space configurations, using the selected RA configuration to monitor the downlink control channel for the DCI comprises using the selected CORESET configuration to monitor the downlink control for the DCI, and using the selected CORESET configuration to monitor the downlink control channel for DCI comprises the communication device monitoring at least one of the search space configurations specified by the selected CORESET configuration.

5. The method of claim 1, wherein the first CSS is associated with a small data transmission service and the second CSS is associated with a service different than the small data transmission service, or the first CORSET is associated with the small data transmission service and the second CORESET is associated with a service different than the small data transmission service.

6. The method of claim 1, wherein the first service is a mission critical service, the first CSS is associated with a mission critical service and the second CSS is associated with a service different than the mission critical service, or the first CORSET is associated with the mission critical service and the second CORESET is associated with a service different than the mission critical service.

7. A non-transitory computer readable storage medium storing a computer program comprising instructions which when executed by processing circuitry of a communication device causes communication device to perform the method of claim 1.

8. A communication device, the communication device comprising:

processing circuitry; and a memory, the memory containing instructions executable by the processing circuitry, wherein the communication device is configured to perform a method comprising:

detecting a need to establish a connection with an access point in order to obtain a first service of a first service type;

after detecting the need to establish the connection with the access point, performing a first step of a random access (RA) procedure by transmitting an RA preamble to the access point;

selecting an RA configuration from a set of two more RA configurations, wherein the set of RA configurations comprises: i) common search space (CSS) information identifying a set of two or more CSSs, and/or ii) a set of two or more control resource set (CORESET) configurations, and selecting the RA configuration comprises selecting a CSS from the set of two or more CSS or selecting a CORESET configuration from the set of two or more CORESET configurations; and using the selected RA configuration to perform a second step of an RA procedure, wherein0 i) the set of RA configurations comprises the CSS information, and the set of two or more CSSs comprises: a first CSS associated with the first service type of the first service and a second CSS that is not associated with the first service type of the first service, or ii) the set of RA configurations comprises the set of two or more CORESET configurations, and the set of two or more CORESET configurations comprises: a first CORESET configurations associated with the first service type of the first service and a second CORESET configurations that is not associated with the first service type of the first service, and further wherein i) the communication device selects the first CSS associated with the first service type as a result of the communication detecting a need to obtainthe first service, or ii) the communication device selects the first CORESET configuration associated with the first service type as a result of the communication device detecting a need to obtain the first service.

9. A method performed by a network node, the method comprising:

the network node broadcasting a system information block (SIB) comprising:

i) first common search space (CSS) information identifying a first CSS for use by UEs belonging to a first group of UEs when performing a random access (RA) procedure; and ii) second CSS information identifying a second CSS for use by UEs belonging to a second group of UEs when performing the RA procedure, wherein the second CSS does not overlap with the first CSS; and after broadcasting the SIB, the network node receiving an RA preamble transmitted by a first UE;

after receiving the RA preamble, the network node determining that the first UE belongs to the first group of UEs;

in response to receiving the RA preamble and after determining that the first UE belongs to the first group of UEs, transmitting downlink control information (DCI) to prepare the first UE to receive a random access response, wherein the network node transmits the DCI using the first CSS as a result of determining that the first UE belongs to the first group of UEs; and after transmitting the DCI using the first CSS, transmitting the random access response, wherein the first group of UEs comprises UEs having a normal priority or associated with normal services, and the second group of UE comprises UEs having a not-normal priority or associated with a particular service.

10. The method of claim 9, wherein the second group of UEs comprises UEs seeking to obtain a small data transmission service.

11. A network node, the network node comprising:

processing circuitry; and a memory, the memory containing instructions executable by the processing circuitry, wherein the network node is configured to perform a method comprising:

the network node broadcasting a system information block (SIB) comprising:

i) first common search space (CSS) information identifying a first CSS for use by UEs belonging to a first group of UEs when performing a random access (RA) procedure; and ii) second CSS information identifying a second CSS for use by UEs belonging to a second group of UEs when performing the RA procedure, wherein the second CSS does not overlap with the first CSS; and after broadcasting the SIB, the network node receiving an RA preamble transmitted by a first UE;

after receiving the RA preamble, the network node determining that the first UE belongs to the first group of UEs;

in response to receiving the RA preamble and after determining that the first UE belongs to the first group of UEs, transmitting downlink control information (DCI) to prepare the first UE to receive a random access response, wherein the network node transmits the DCI using the first CSS as a result of determining that the first UE belongs to the first group of UEs; and after transmitting the DCI using the first CSS, transmitting the random access response, wherein the first group of UEs comprises UEs having a normal priority or associated with normal services, and the second group of UE comprises UEs having a not-normal priority or associated with a particular service.

* * * * *